United States Patent
Harukawa et al.

(12) 
(10) Patent No.: US 6,315,513 B1
(45) Date of Patent: Nov. 13, 2001

(54) AUTOMATED WAREHOUSE AND AUTOMATED WAREHOUSE MANAGEMENT METHOD

(75) Inventors: Sumio Harukawa; Masao Toyama; Yukiharu Tokisato; Takenori Hirakawa; Atsuhiko Iijima, all of Tokyo (JP)

(73) Assignee: Hirata Corporation, Tokyo (JP)

(*) Notice: Subject to any disclaimer, the term of this patent is extended or adjusted under 35 U.S.C. 154(b) by 0 days.

(21) Appl. No.: 09/401,527

(22) Filed: Sep. 22, 1999

(30) Foreign Application Priority Data

Dec. 25, 1998 (JP) .................................................. 10-369648
Jul. 5, 1999 (JP) .................................................. 11-190521

(51) Int. Cl.[7] .................................................. B65G 1/00
(52) U.S. Cl. .................. 414/286; 414/281; 414/626; 414/799; 414/807
(58) Field of Search .................. 414/286, 281, 414/273, 626, 799, 807

(56) References Cited

U.S. PATENT DOCUMENTS 4,773,810 * 9/1988 Nisimura et al. ................ 414/286 X
4,993,906 * 2/1991 Nisimura et al. .................... 414/286

FOREIGN PATENT DOCUMENTS

412902 * 1/1992 (JP) .
06-115608  4/1994 (JP) .
06-312838  11/1994 (JP) .

* cited by examiner

Primary Examiner—Steven A. Bratlie
(74) Attorney, Agent, or Firm—Burns, Doane, Swecker & Mathis, LLP

(57) ABSTRACT

In order to provide an automated warehouse having high space utilization efficiency, high floor area utilization efficiency, and high loading/unloading efficiency and a method of managing the warehouse, a transfer unit is placed above a stocking area, a holding unit of the transfer unit can move three-dimensionally, and an elevating unit of the transfer unit, which holds a stock object and raises/lowers it, raises/lowers a stock object without making it roll. This transfer unit holds a stock object in a loading area, and transfers the loaded stock object over stock objects stored in the stocking area. The transfer unit then lowers this stock object from above and stacks it flat or on another stock object. When an object is to be unloaded, the transfer unit holds the stock object from above and transfers it to an unloading area through the air.

6 Claims, 22 Drawing Sheets

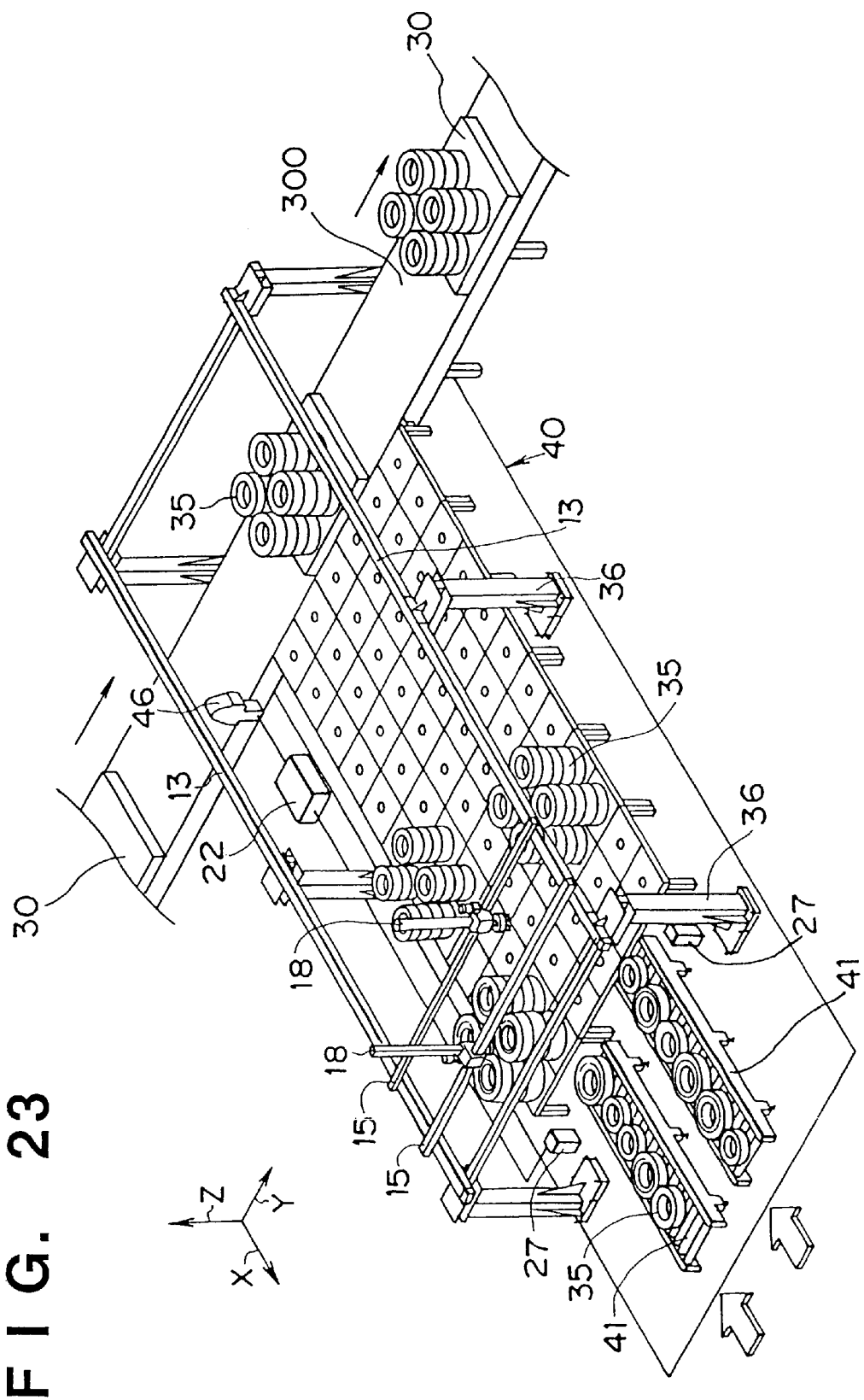

AUTOMATED WAREHOUSE AND AUTOMATED WAREHOUSE MANAGEMENT METHOD

BACKGROUND OF THE INVENTION

1. Field of the Invention

The present invention relates to an automated warehouse having high space utilization efficiency and high floor surface utilization efficiency and a management method therefor.

2. Description of the Related Art

Conventional production plants widely use computer-controlled automated warehouses to store and manage loaded stock objects such as products, parts, and materials and output them, as needed. Such automated warehouse can be roughly classified into unmanned automated warehouses such as stacker crane type automated warehouses and manned automated warehouses such as forklift type automated warehouses.

As shown in the plan view of FIG. 1, in general, in an unmanned automated warehouse 1 of the former type, racks 3 having storing spaces 2 arranged in rows and columns are installed on the two sides of the traveling path of a stacker crane 4, the stacker crane 4 travels in the space between the racks along a rail 5, and a fork unit 6 moves up and down in the stacker crane 4. In a loading area 7, when the stacker crane 4 having a stock object placed on the fork unit 6 moves. horizontally, and the fork unit 6 moves vertically to convey it to the target storing space 2, the fork unit 6 is driven in the horizontal direction to load the stock object in the target storing space 2. In contrast to this, when a stock object is to be unloaded, the fork unit 6 moves to the target storing space 2, picks the stock object from the storing space 2, and conveys it to an unloading area 8.

In a manned automated warehouse of the latter type, an operator drives and operates a forklift to store stock objects placed on a pallet in a target storing space of a rack, together with the pallet, or picks stock objects on a pallet from a storing space, and conveys them to an unloading area.

The former automated warehouse and the latter automated warehouse differ in that the former is unmanned, and the latter is manned. However, they have the following many common points.

(a) Stock objects are stored in racks partitioned into storing spaces in rows and columns (in the form of a matrix)

(b) Stock objects are translated to be loaded/unloaded into/from storing spaces.

(c) A space for allowing loading/unloading means such as a stacker crane and forklift to move and operate is required on the floor surface.

(d) Racks must be arranged to allow a stacker crane or forklift to approach.

(e) In loading/unloading operation, stock objects placed on a pallet and stock objects stored in a storing case are handled.

In either of the conventional automated warehouses, however, since racks are partitioned in the form of a matrix to arrange storing spaces in rows and columns, members constituting the racks, spaces for partitioning members between storing spaces, spaces for pallets and storing cases, and available spaces (marginal gaps) for loading/unloading operation are required. Each storing space occupies a wide space as compared with the size of a stock object, and the outer dimensions of each rack are large.

In addition, storing spaces formed in each rack tend to have a uniform size in consideration of the formation and operation of racks. For this reason, each storing space has a size corresponding to the size of a largest stock object. When a general stock object or small stock object is stored in a storing space, a wasteful space is produced in the storing space. The storing spaces cannot therefore be fully utilized depending on the type of stock objects. In many cases, the ratio of the area occupied by a rack to the area occupied by all the stock objects is less than 50%. That is, the storage efficiency is low when racks are used.

More specifically, FIG. 2A shows the rack 3 in which largest stock objects 10A placed on a pallet 9 and a general stock object 10B on a pallet 9 are stored in storing spaces 2. FIG. 2B shows a comparison between the area occupied by the stock objects 10A and 10B collected at a corner and the area occupied by the rack 3. FIGS. 2A and 2B show how much an extra rack-occupying area is required as compared with the sizes of the stock objects 10A and 10B. In consideration of a volume ratio in this state, it is obvious that the space efficiency and volume efficiency of the automated warehouse are low when multistage racks are used.

In addition, when multistage racks are used, stock objects are loaded/unloaded into/from storing spaces by translating the stock objects from the front surfaces of the racks by using a fork unit or the like. For this reason, a space for allowing a stacker crane, forklift, or the like which is used for loading/unloading operation to travel must be ensured on the floor surface. Furthermore, the layout of an automated warehouse is limited such that two or more racks cannot be arranged in contact with each other, because a loading/unloading means such as a fork unit must access the racks. As a consequence, the ratio of the area occupied by the storing spaces to the floor surface in the automated warehouse is low, and hence the storage efficiency is low. In some case wherein a forklift is used, in particular, the floor surface area in which the forklift travels becomes larger than the floor surface area of storing racks.

In loading/unloading operation using pallets, one pallet on which many stock objects can be stacked is the operation unit. However, the number of stock objects requested to be unloaded rarely coincides with the number of stock objects placed on one pallet. For this reason, when an unload request is generated, a pallet is conveyed to a picking position in an unloading area, stock objects are picked from the pallet by the required number, and the remaining stock objects are loaded into the original storing space, together with the pallet. This tends to demand extra loading/unloading operation. In addition, the operator often picks stock objects by operating a balancer or the like, posing problems in terms of operation efficiency and safety.

According to Japanese Patent Laid-Open No. 6-115608, a trolley that travels along a ceiling is prepared above a stocking area, and a stock object is held with a container hoisting attachment prepared below the trolley. With this structure, a stock object can be conveyed to an arbitrary place in the stocking area or unloaded from the stocking area. According to this automated warehouse, since no space for allowing the trolley to travel is required on the floor surface in the stocking area, a wide stocking area can be used.

In this conventional automated warehouse, however, since the container hoisting attachment is suspended from the trolley with a wire (winding rope), when the trolley travels while a stock object is held with the container hoisting attachment, the stock object rolls. Even after the trolley is stopped, the stock object rolls. This makes it difficult to place the stock object at an accurate position. For his reason, when a stock object is stacked on another stock object by lowering the container hoisting attachment, a load of stock objects may fall because of a positional shift of the stock object.

When the stock object held with the container hoisting attachment rolls, the stock object may collide with another stock object stacked at a position near the position where the held stock object is to be placed. For this reason, a considerably large interval must be ensured between stock objects stacked in the stocking area. As a consequence, the stock object storage efficiency of the stocking area is degraded.

A production line for various types of tires with various sizes requires an assorting unit for randomly conveying the various types of tires with the various sizes manufactured in the previous process to the next process.

FIG. 13 is a perspective view showing an example of a conventional tire sorting unit. Referring to FIG. 13, various types of tires with various sizes manufactured in the previous process are placed on loading conveyors 102 and 103 and conveyed in the direction indicted by the arrows, and tires 35 are sorted according to types by assorting units 106 and 107 installed at the junction of branch conveyors 104 and 105. As a result, the tires are stacked on each other on branch conveyors 104a to 104g and 105a to 105g by a stacking unit. After the tires in this state are respectively conveyed to unloading conveyors 110 and 111 in the center, the tires in a stacked state are transferred into an empty unit 109 set in a transfer unit 220 in advance, thus obtaining a tire-loaded pallet 130. Thereafter, the pallet is conveyed downstream on a loading conveyor 123. The tire-loaded pallet 130 is conveyed to the next step by a truck or forklift.

As described above, according to the conventional tire sorting unit, for example, to select and convey seven types of tires, seven branch conveyors are prepared. In order to handle more types of tires with more sizes, branch conveyors must be added, resulting in increases in cost and installation area.

In consideration of the total time of the time required to stack tires on each other on branch conveyors, wait time, and the time required to convey tires on the conveyors, a long period of time is required to obtain a tire-loaded pallet. According to Japanese Patent Laid-Open No. 06-312838, a tire transfer unit has been proposed. In this unit, a tire storing place constituted by a plurality of tire storing conveyors arranged side by side and tire conveyance between the tire storing place and loading/unloading tracks are mechanized. In this proposal as well, conveyors are required for the respective types of tires.

SUMMARY OF THE INVENTION

The present invention has been made to solve the above technical problems in the prior art, and has as its object to provide an automated warehouse having high space utilization efficiency and high floor surface utilization efficiency. In addition, it is another object of the present invention to provide a management method for an automated warehouse having high loading/unloading efficiency.

It is still another object of the present invention to provide an automated warehouse and management method which can eliminate the necessity to add any branch conveyor when more types of tires with more sizes are to be handled, eliminate the necessity to add any installation area, and can greatly shorten the time required to stack tires, standby time, and convey time, thereby shortening the time to obtain a loaded pallet.

In order to solve the above problems and achieve the above objects, according to the present invention, there is provided an automated warehouse characterized by comprising a holding unit for holding a stock object, holding unit elevating means for elevating the holding unit while restricting a position of the holding unit in a direction different from an elevating direction, two-dimensional moving means, placed above a stocking area for storing the stock object, for moving the holding unit elevating means in a substantially horizontal direction, and a management unit for managing loading/unloading information of the stock object.

According to the automated warehouse of the present invention, since the two-dimensional moving means for moving the holding unit in a space above the stocking area in which stock objects are stored is prepared, a stock object can be stored in the stocking area through the space above the stocking area or a stock object can be picked from the stocking area by using the two-dimensional moving means. According to this automated warehouse, therefore, the space in which a stacker crane, forklift, or the like travel need not be set on the floor surface of the automated warehouse, and almost the entire area of the automated warehouse can be used. This makes it possible to construct an automated warehouse having high storage efficiency and high floor surface and space utilization efficiency. In addition, since the two-dimensional moving means is not present on the floor surface, a work area with high safety can be realized.

In this automated warehouse, since the holding unit elevating means raises/lowers the holding unit in a direction different from the raising/lowering direction while restricting the position of the holding unit, when the holding unit moves vertically or the holding unit holding a stock object is moved by the two-dimensional moving means, the holding unit can accurately place the stock object in the stocking area without rolling. When, therefore, stock objects are stacked on each other, there is no possibility of the load falling. In addition, in this automated warehouse, stock objects can be stored at accurate positions. When a stock object is placed in the stocking area, the stock object held by the holding unit does not easily collide with an adjacent stock object. Hence, the space between stacked stock objects in the stock area can be reduced, and the storage efficiency of the stocking area can be improved.

In addition, in the automated warehouse, the holding unit elevating means raises/lowers the holding unit upon extension/retraction of the holding unit elevating means or a combination of the holding unit elevating means and the holding unit. As a method of raising/lowering the holding unit while restricting the position of the holding unit in a direction different from the raising/lowering direction, a method of using a mechanism for raising/lowering the holding unit along a rail fixed to the two-dimensional moving means in the vertical direction can be used. If, however, the holding unit is moved vertically by extension/retraction in this manner, the holding unit elevating means like the rail does not protrude downward from the holding unit. The space of the stocking area can therefore be efficiently used because the holding unit elevating means does not collide with stock objects stacked on each other in the stocking area, or the height of the load of stock objects is not limited to prevent such a collision.

In addition, in the automated warehouse, the stocking area is an area in which stock objects are stacked flat or stacked on each other. In this case, stacking stock objects flat or on each other in the stocking area is equivalent to placing the stock objects flat or stacking them on each other in the stocking area without physically or mechanically partitioning the stocking area. In addition, since stock objects are stacked flat or on each other without partitioning the stocking area, a reduction in the substantial space of the stocking area due to racks and the like can be prevented, and the tire stocking area can be efficiently used. In addition, this automated warehouse can flexibly cope with the types (shapes) of stock areas. According to this embodiment, the space utilization efficiency and storage efficiency of stock objects can be greatly improved.

The automated warehouse includes the holding unit having the function of turning a held stock object, and a means for detecting the posture of the stock object. As the means for detecting the posture of a stock object, an image recognition unit, photoelectric sensor, optical sensor, or the like can be used.

According to this arrangement, the angle of a stock object can be matched with the space of the stocking area by detecting the posture of a stock object held by the holding unit and turning the holding unit. This can further improve the storage efficiency of the stocking area. Furthermore, since the holding unit can be turned in accordance with the posture of a stock object when the stock object is to be held, the stock object can be accurately held.

In addition, the warehouse is characterized in that the warehouse separately comprises a combination of the holding unit for loading a stock object into the stocking area, the holding unit elevating means, and the two-dimensional moving means, and a combination of the holding unit for unloading a stock object from the stocking area, the holding unit elevating means, and the two-dimensional moving means.

According to this arrangement, since the warehouse separately includes the pair of the holding unit and holding unit moving means for loading operation and the pair of the holding unit and holding unit moving means for unloading operation, loading operation and unloading operation can be simultaneously performed, thus efficiently performing loading/unloading operation. In addition, when one pair of the holding unit and holding unit moving means fails, the other pair of the holding unit and holding unit moving means can be used to perform loading/unloading operation. This prevents interruption of loading/unloading operation.

In the automated warehouse, a loading area in which a loaded stock object is held by the holding unit is set to be adjacent to an unloading area in which a stock object to be unloaded is released from the holding unit. With this structure, stock objects can be stocked up to positions near the walls of the automated warehouse except for a side on which the loading and unloading areas are set in the stocking area. This makes it possible to effectively use the automated warehouse.

In addition, there is provided a management method for the automated warehouse, characterized by comprising the steps of constructing a virtual stocking area space corresponding to a real space in the stocking area, dividing the virtual stocking area space into storing areas for storing stock objects according to types, and storing a stock object in a stocking area as a real space corresponding to the virtual storing area for storing the stock object of the corresponding type in response to a request to load the stock object.

According to the management method for the automated warehouse, since stocking places for stock objects of the respective types are managed in the virtual stocking area space, the stocking area can be effective used unlike the case wherein stock objects are assorted by partitioning real spaces of a stocking area, and the stocking area is reduced by partitions. In addition, stock objects can be managed by assorting and storing the objects in the stocking area simply at low cost without requiring any installation work, e.g., partitioning of the real space.

The management method for the automated warehouse is characterized by further comprising the step of dividing the virtual stocking area space into a plurality of storing areas according to storage attributes, and allowing a size, position, and storage attribute of each storing area to be changed, as needed. In this case, the storage attributes indicate the type, size, height, shape, packing form, and the like of the stock object to be stored.

According to the management method for the automated warehouse of the present invention, since the stored state of stock objects can be managed in a virtual space, the stocking area can always be used with the maximum efficiency by changing the size, position, and storage attributes of the storing area in accordance with the stored state.

The management method for the automated warehouse comprises the step of causing display means to display images of the virtual stocking area space, virtual storing areas obtained by dividing the virtual stocking area space, and stock objects stored in the real space of the stocking area.

Even the user in a place remote from the stocking area can therefore know the stored state of stock objects from the display screen of the display means. Even when stock objects stored in the real space without any partitions are difficult to assort, in particular, the assorted state of the stocking area spaces and the stored state of the stock objects in the respective divided areas can be checked at a glance.

In the management method for the automated warehouse, the virtual stocking area space is divided into an area for storing stock objects of a specific type and an area in which an arbitrary stock object can be stored, and the method comprises the step of, in response to a request to load a stock object, searching for an area for storing the stock object to check whether an available space is present in the area, and storing the stock object in the area in which an arbitrary stock object can be stored, if no available space is present.

According to this arrangement, since an area where arbitrary stock objects can be stored is prepared, when a storing area is filled with stock objects of a specific type, stock objects an be stored in the area where arbitrary stock objects can be stored. This allows stock objects to be flexibly stored in the stocking area.

In the arrangement method for the automated warehouse, the area for storing the stock objects of the specific type and the area in which an arbitrary stock object can be stored can be changed in accordance with a stored state of stock objects stored in the real space of the stocking area.

According to this management method, therefore, the utilization state of the stocking area can be constantly changed in accordance with the loading state of stock objects, and the stocking area is constantly changed in accordance with the loading state, thereby coping with the loading state.

There is provided an automated warehouse in which various types of tires with various sizes randomly loaded from a previous process are assorted first, and then stacked on each other on a pallet to be unloaded, characterized by comprising a loading area, stocking area, and unloading area which are arranged to be adjacent to each other, loading/conveying means, placed in the loading area, for loading the various types of tires with the various sizes, tire discrimination means, placed in the loading area, for identifying the various types and various sizes, two-dimensional moving means for two-dimensionally moving holding unit elevating means at a predetermined height from each of the areas, the holding unit elevating means raising/lowering a holding unit which is driven between a holding state in which the holding unit holds the tire from an inner diameter side and a releasing state in which the tire is released, a plurality of real stocking spaces which are set by dividing the stocking area into areas and assigning the areas according to the various types and various sizes and in which tires of the same type are stocked in a stacked state, pallet loading/unloading means placed in the unloading area and constituted by a pallet loading unit for loading an empty pallet and a pallet unloading unit for unloading a loaded pallet on which the tires in the stacked state are loaded, transfer means which is placed between the pallet loading means and the stocking area and moved between the pallet loading unit, a transfer position, and the pallet unloading unit, and an address space stored in control means in correspondence with the real stocking spaces, wherein one tire or the tires in the stacked state are transferred onto an empty pallet positioned at the transfer position by cooperation between the holding unit elevating means and the two-dimensional moving means, and the real stocking spaces are managed by updating the address space in accordance with the identification result obtained by the tire discrimination means and an unloading result obtained by the cooperation, and predetermined driving control is performed on the holding unit elevating means, the two-dimensional moving means, and the pallet loading/unloading means.

Furthermore, there is provided a management method for an automated warehouse in which various types of tires with various sizes randomly loaded from a previous process are assorted first, and then stacked on each other on a pallet to be unloaded, characterized by comprising the steps of arranging a loading area, stocking area, and unloading area to be adjacent to each other, loading the various types of tires with the various sizes by using loading/conveying means placed in the loading area, identifying the various types of tires with the various sizes by using tire discrimination means placed in the loading area, two-dimensionally moving two-dimensional moving means at a predetermined height from each of the areas, the two-dimensional moving means including holding unit elevating means for raising/lowering a holding unit driven between a holding state in which the holding unit holds the tire from an inner diameter side and a releasing state in which the tire is released, dividing the stocking area into a plurality of real storing areas which are set by being assigned according to the various types and various sizes and in which one tire or tires in a stacked state are stored, loading an empty pallet into a pallet loading unit by using pallet loading/unloading means placed in the unloading area, and unloading a loaded pallet on which the tires in the stacked state are loaded from a pallet unloading unit, moving the empty pallet and loaded pallet between the pallet loading unit, a transfer position, and the pallet unloading unit by using transfer means placed between the pallet loading/unloading means and the stocking area, and setting an address space stored in control means in correspondence with the real stocking spaces, wherein the tires in the stacked state are transferred onto an empty pallet positioned at the transfer position by cooperation between the holding unit elevating means and the two-dimensional moving means, and the real stocking spaces are managed by the step of updating the address space in accordance with the identification result obtained by the tire discrimination means and an unloading result obtained by the cooperation, and predetermined driving control is performed on the holding unit elevating means, the two-dimensional moving means, and the loading/unloading means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 18A and 18B are sectional views showing the internal structure of a double-speed mechanism, in which FIG. 18A shows a retracted state, and FIG. 18B shows an extended state;

FIG. 23 is a perspective view showing another structure of the line 40 in the tire automated warehouse.

DETAILED DESCRIPTION OF THE PREFERRED EMBODIMENTS

The preferred embodiments of the present invention will be described below with reference to the accompanying drawings.

First Embodiment

Figure 1:
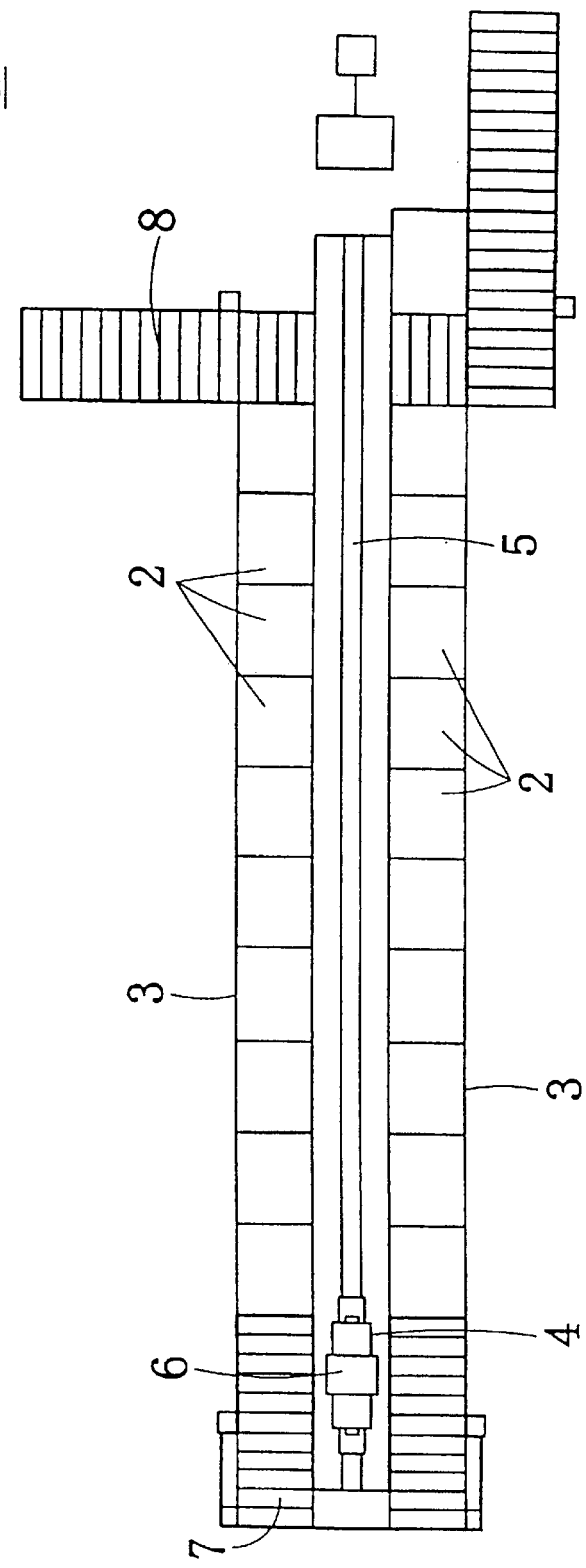
FIG. 1 is a plan view showing the structure of a conventional automated warehouse.
Figure 2A:
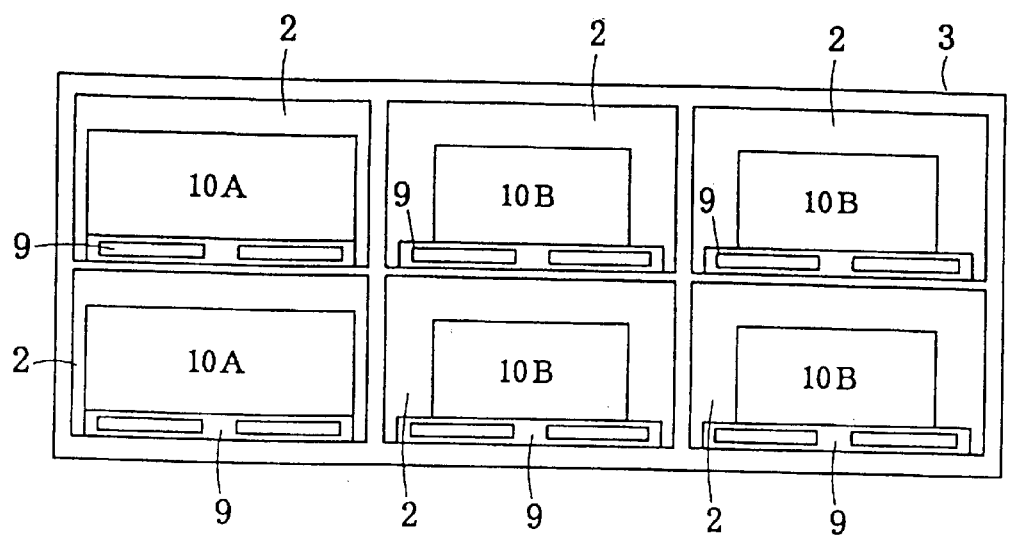
FIG. 2A is a front view showing a rack in which stock objects are stored.
Figure 2B:
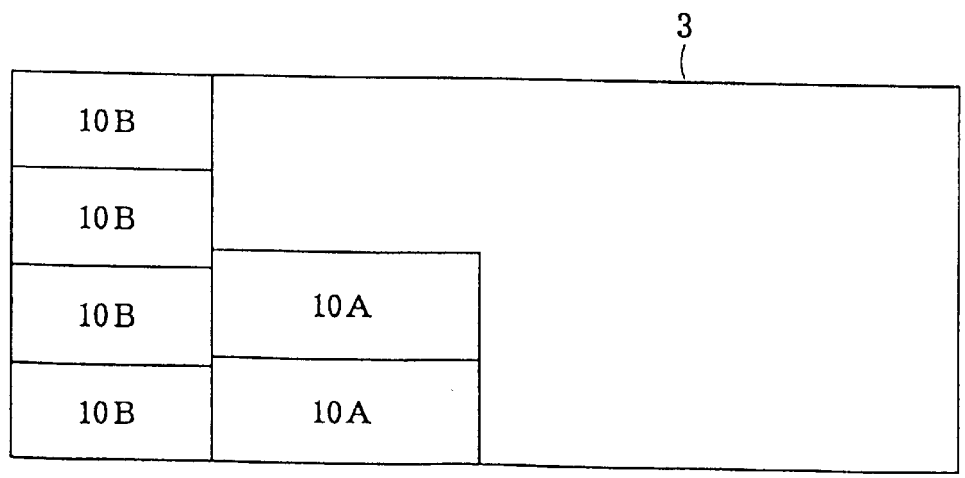
FIG. 2B is a view showing a comparison between the size of the rack and the occupied area of all stock objects.
Figure 3:
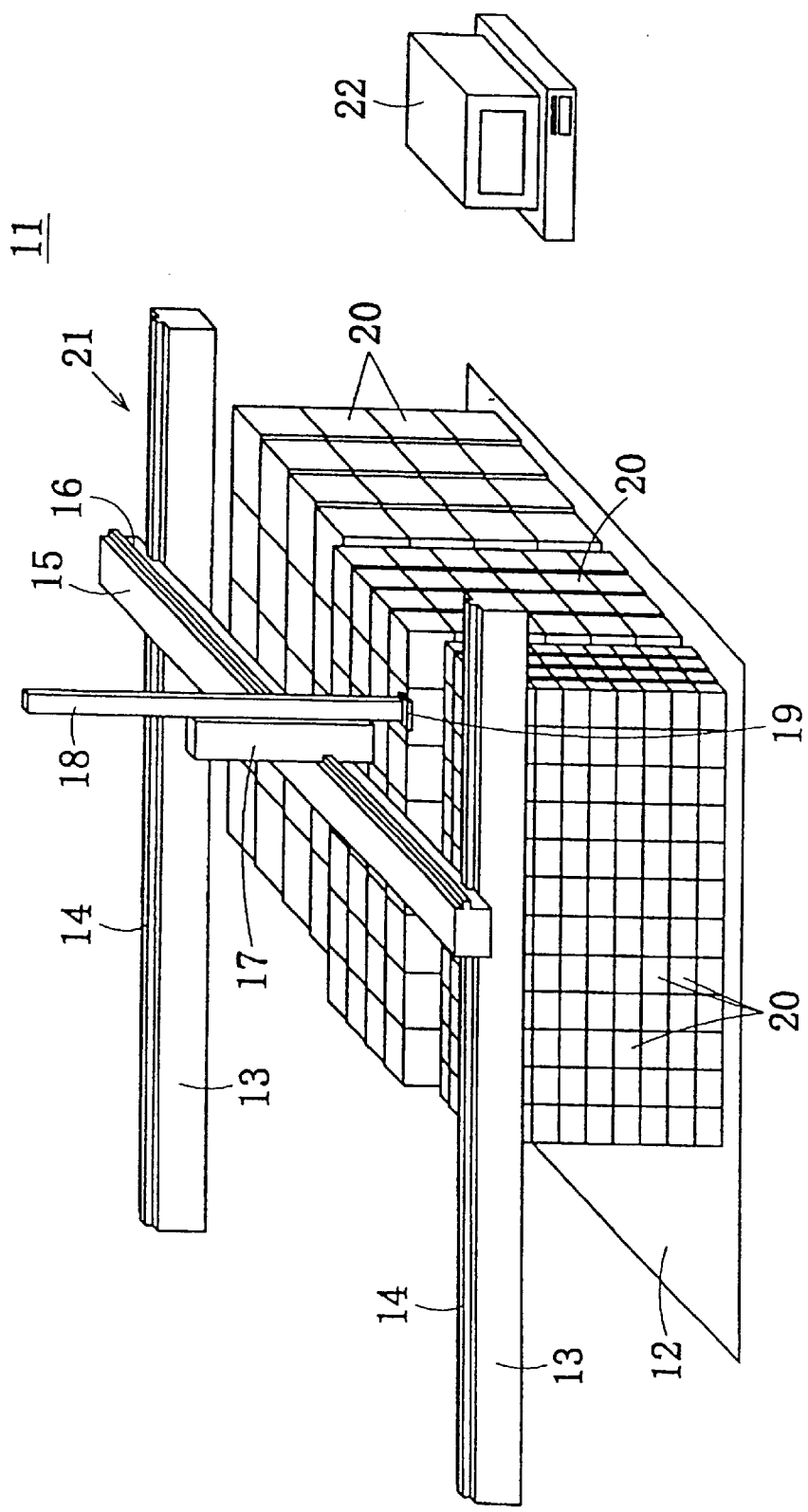
FIG. 3 is a perspective view showing the structure of an automated warehouse according to an embodiment of the present invention.

FIG. 3 is a schematic perspective view showing the structure of an automated warehouse 11 according to an embodiment of the present invention. According to this automated warehouse 11, the overall building used as a warehouse serves as an automated warehouse. That is, almost the entire floor surface of the building serves as a stocking area 12 for storing stock objects. Two parallel fixed beams 13 are placed above the stocking area 12, and rails 14 are mounted on the upper surfaces of the fixed beams 13. The two ends of each fixed beam 13 may be supported by columns fixed upright on the floor or may be fixed on wall surfaces of the plant building or automated warehouse 11.

A movable beam 15 is placed between the fixed beams 13 to be perpendicular to the fixed beams 13. The movable beam 15 is designed to travel along the rails 14 on the fixed beams 13. For example, the movable beam 15 is driven to travel by the following method. Racks are mounted on the fixed beams 13, and motor-driven pinions mounted on the movable beam 15 are meshed with the racks. The movable beam 15 is caused to travel by rotating the pinions (not shown).

A rail 16 is also mounted on a side surface of the movable beam 15. An elevating unit 17 mounted on the side surface of the movable beam 15 is designed to travel horizontally along the rail 16 on the movable beam 15. The elevating unit 17 may be driven to travel by the following method. A rack is mounted on the movable beam 15, and a motor-driven pinion mounted on the elevating unit 17 is meshed with the rack. The elevating unit 17 is made to travel by rotating the pinion (not shown). The elevating unit 17 also has a holding unit 18 for holding a stock object 20. The holding unit 18 is raised/lowered by a driving source such as an air driving or motor driving source. The holding unit 18 has a holding head 19 on its lower end portion. As this holding head 19, any type of holing member may be prepared in accordance with the type of stock object 20. For example, a holding unit of a vacuum suction type, robot hand type, or opening/closing chuck type can be used. Note that the driving method for the movable beam 15 or elevating unit 17 is not limited to the method of using a rack/pinion mechanism, and any type of mechanism can be used.

The elevating unit 17 is coupled to the holding unit 18 through a slide mechanism to prevent the holding unit 18 from rolling not only while the holding unit 18 is at rest but also when the holding unit 18 is raised/lowered. In addition, the holding unit 18 and elevating unit 17 are structured to extend from each other. When the holding unit 18 moves up and down, the holding unit 18 and elevating unit 17 do not protrude downward from the holding head 19.

A plurality of types of holding heads 19 may be mounted on the lower end portion of the holding unit 18 to be exchanged in accordance with the type of stock object 20. Alternatively, the holding heads 19 of the holding unit 18 may be exchanged by using an auto-hand changer or the like.

The fixed beams 13, movable beam 15, elevating unit 17, and holding unit 18 constitute a transfer unit 21 of the automated warehouse 11. The holding unit 18 can move parallel to the floor surface of the stocking area 12 as the movable beam 15 and elevating unit 17 travel. The holding unit 18 is also raised/lowered by the elevating unit 17. That is, the holding unit 18 can freely move in a 3-D space above the stocking area 12. Note that the traveling and elevating positions of the holding unit 18 are numerically controlled by a control computer. In addition, inventory management information, loading information, and unloading information, such as the types, quantities, storing positions, and the like of stock objects 20 stored in the automated warehouse 11, are managed by a management computer 22. The control computer and management computer 22 maybe a single computer.

In this case, the stocking area 12 ensured in the automated warehouse 11 is a floor surface on which stock objects 20 are to be stacked and stored and no physical partitions are present. The overall stocking area 12 integrally serves as a stocking area without being partitioned into storing spaces like conventional storing racks. The stocking area 12 may be an exposed concrete surface in the automated warehouse 11, a floor surface (ground) on which ties and the like are laid, or a stepped surface instead of an entire flat surface.

The stock object 20 to be handled by the automated warehouse 11 is the minimum shipment unit and may take any form when being stacked flat in the stocking area 12. More specifically, one storing case or box in which a plurality of products, parts, and the like are stored is loaded/unloaded as the minimum loading/unloading unit (one stock object 20). In addition, one pallet on which a plurality of products, parts, and the like are mounted is loaded/unloaded as the minimum loading/unloading unit. Furthermore, when products, parts, and the like are separately handled, each of them is handled as the stock object 20. That is, these products and parts are loaded/unloaded one by one.

When, however, the stock objects 20 are to be stacked on each other in the stocking area 12, care must be taken a little. If the stock objects 20 such as products and parts themselves have forms and strengths that allow them to be stacked on each other, the stock objects 20 may be directly stacked on each other in the stocking area 12. If, however, load falling may occur when the stock objects 20 are stacked on each other, the stock objects 20 in storing cases or boxes are preferably stacked on each other in the stocking area 12.

As described above, this automated warehouse 11 handles one stock object 20 as the minimum loading/unloading unit. When the stock object 20 is loaded into a loading area, the transfer unit 21 moves the holding unit 18 into the loading area and lowers the holding unit 18. The holding unit 18 holds the stock object 20, which is loaded into the loading area, from above. The management computer 22 determines a stocking position in accordance with the type of stock object 20. The transfer unit 21 raises the holding unit 18 holding the stock object 20 and makes the holding unit 18 travel in the air, thereby conveying the stock object 20 over a load of stock objects 20 to a destination in the stocking area 12. The transfer unit 21 then lowers the holding unit 18 at the target position to lower the stock object 20 on a floor surface or another stock object 20 at the storing position, and releases the stock object 20.

Upon reception of an unload request, the transfer unit 21 moves the holding unit 18 to the position where the target stock object 20 is stored, lowers the holding unit 18 to hold the requested stock object 20 from above, and lifts the stock object 20 with the holding unit 18. The transfer unit 21 then conveys the lifted stock object 20 over a load of stock objects 20 into an unloading area, and discharges it from the unloading area.

When the stock object 20 is to be loaded/unloaded, the holding unit 18 and elevating unit 17 extend/retract to raise/lower the stock object 20. With this structure, when the holding unit 18 lifts the stock object 20, the holding unit 18 and elevating unit 17 do not protrude downward from the stock object 20. Therefore, there is no possibility that these units collide with the stock objects 20 stacked in the stocking area 12. This makes it possible to stack the stock objects 20 high in the stocking area 12 and improve the space utilization efficiency of the automated warehouse 11.

In addition, since the holding unit 18 does not roll with respect to the elevating unit 17, when the stock object 20 held by the holding unit 18 is stacked on the stock object 20 in the stocking area 12, there is no possibility that the stock object 20 shifts its position and the load falls. Furthermore, since the holding unit 18 does not roll, and the stock object 20 held by the holding unit 18 does not collide with the adjacent stock object 20, the space between the adjacent stock objects 20 can be reduced, and the storage efficiency of the automated warehouse 11 can be improved.

As describe above, in the automated warehouse 11 of the present invention, the upper space in the stocking area 12 in which the stock objects 20 are stored is used as the moving area of the transfer unit 21, and the stock object 20 is loaded or unloaded by accessing the stocking area 12 from the upper space in the stocking area 12. Therefore, the transfer unit 21 does not occupy the floor surface unlike the automated warehouse 1 using the stacker crane or forklift, and almost the entire floor surface of the automated warehouse 11 can be used as the stocking area 12. This greatly improve the storage efficiency and floor surface utilization efficiency of the automated warehouse 11.

In this automated warehouse 11, the stock objects 20 are stored in the space between the floor surface and the transfer unit 21 in the stocking area 12, and the transfer unit 21 travels above the stock objects 20 stored in the stocking area 12. In order to store the stock objects 20 in a large quantity, therefore, the transfer unit 21 is preferably installed at the highest position. That is, the transfer unit 21 is preferably installed near the ceiling of the plant. In contrast to this, the transfer unit 21 may be installed near the floor surface in the stocking area 12 (or at a position sufficiently lower than the ceiling). If the transfer unit 21 is installed near the floor surface, construction of a new automated warehouse 11, movement of the automated warehouse 11, reconstruction of the automated warehouse 11, or the like can be facilitated. Hence, the term of construction can be shortened. The installation height of the transfer unit 21 may therefore be determined in consideration of the efficient use of the floor surface and ease of construction of a new warehouse, movement of the warehouse, and the like. In addition, in this automated warehouse 11, since the stocking area 12 is used as a stocking area as a whole without being partitioned by physical partitioning means, stock objects 20 with various sizes can be packed/stored in an arbitrary available space. This can implement very efficient, flexible use of the floor surface. Since the space for rack members and the waste of a space produced when the floor surface of uniformly partitioned can be eliminated, the stocking area 12 can be efficiently used 100%.

Furthermore, since stock objects 20 are stacked on each other without using any rack in the stocking area 12, the space in the vertical direction can be effectively used. This makes it possible to realize a space-saving, large-capacity automated warehouse 11. If the stock objects 20 such as products and parts are directly stored in the stocking area 12 without using any pallets and storing cases, the stock objects 20 can be unloaded by a requested number in response to an unload request. This can implement high-efficiency unloading operation.

Automatic assignment of stocking positions by the management computer 22 will be described next. If the management computer 22 automatically assigns stocking positions in the stocking area 12 according to the types of stock objects, the stocking area 12 can be used more efficiently. For this purpose, the following data are registered in the management computer 22 in advance: the stereoscopic shapes, dimensions, and the like of stock objects 20a, 20b, 20c, . . . of all types to be handled; stock object data such as the allowable number of stock objects stacked or allowable height of load for each of the types of objects 20a, 20b, 20c, . . . ; and stocking area data such as the shape and dimensions of the floor surface of the stocking area 12 and the height of the space in the stocking area 12.

Figure 4:
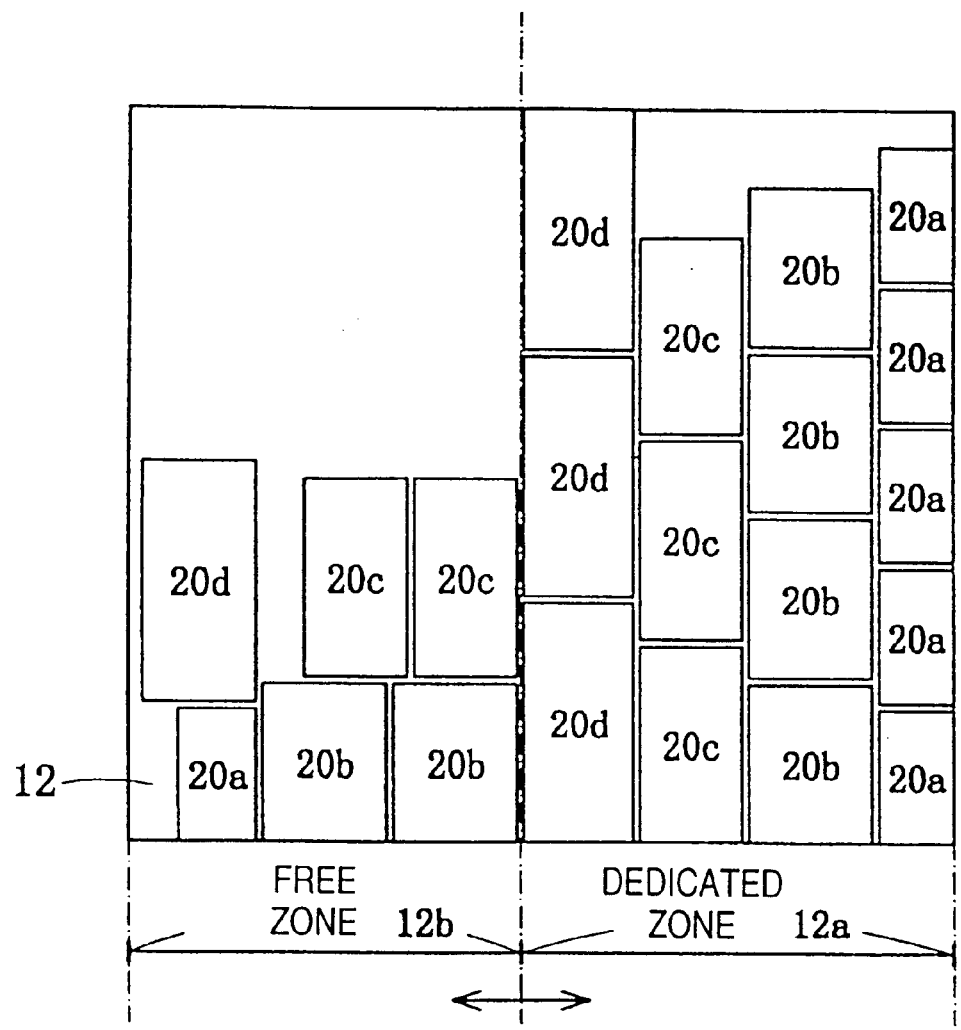
FIG. 4 is a view showing how stock objects are automatically assigned to a stocking area.

The management computer 22 has the function of setting images of the stock objects 20a, 20b, 20c, . . . in the stocking area in software on the basis of the stock object data and stock area data registered in advance. For the sake of processing in the management computer 22, the stocking area 12 is virtually divided into a dedicated zone 12a and free zone 12b, as shown in FIG. 4. In this case, the dedicated zone 12a is an area where predetermined stocking positions are set for the respective types of stock objects. The free zone 12b is a zone where the stock objects 20a, 20b, 20c, . . . can be freely stocked regardless of the types of objects. In addition, in the dedicated zone 12a, the storing positions of the stock objects 20a, 20b, 20c, . . . are determined according to the respective types of objects. That is, this zone is virtually partitioned according to the respective storing positions. These states are graphically displayed on the display of the management computer 22 or the like.

Upon reception of a request to load the stock objects 20a, 20b, 20c, . . . , the management computer 22 searches for the stocking positions of the stock objects 20a, 20b, 20c, . . . in the dedicated zone 12a to check whether available spaces are present at the respective stocking positions. If there are available spaces, the management computer 22 stores the stock objects 20a, 20b, 20c, . . . at the corresponding positions in the dedicated zone 12a. If, however, the spaces at the corresponding stocking positions in the dedicated zone 12a are filled with the stock objects 20a, 20b, 20c, . . . , the management computer 22 determines that there are no available spaces, and stocks, in the free zone 12b, the stock objects 20a, 20b, 20c, . . . of the types that overflow the dedicated zone 12a. The management computer 22 sequentially stocks the stock objects 20a, 20b, 20c, in the free zone 12b, starting from an end of the free zone 12b, regardless of the types of stock objects. Note that the ratio of the dedicated zone 12a to the free zone 12b in the stocking area 12 is constantly changed in accordance with variations in the types of stock objects 20a, 20b, 20c, . . . to be handled and quantities of stock objects of the respective types. The entire stocking area 12 may be the dedicated zone 12a or free zone 12b.

If the flat space (stocking area 12) without any physical partitions is virtually partitioned by the management computer 22 in the above manner, the automated warehouse can flexibly and quickly cope with changes and additions of types of stock objects, changes such as increases/decreases in quantity, and the like, and the stocking area 12 can be smoothly used. In addition, if paths are virtually set in the stocking area 12, spaces where men and equipment can pass can be flexibly formed between the stock objects 20 in the stocking area 12.

Second Embodiment

Figure 5:
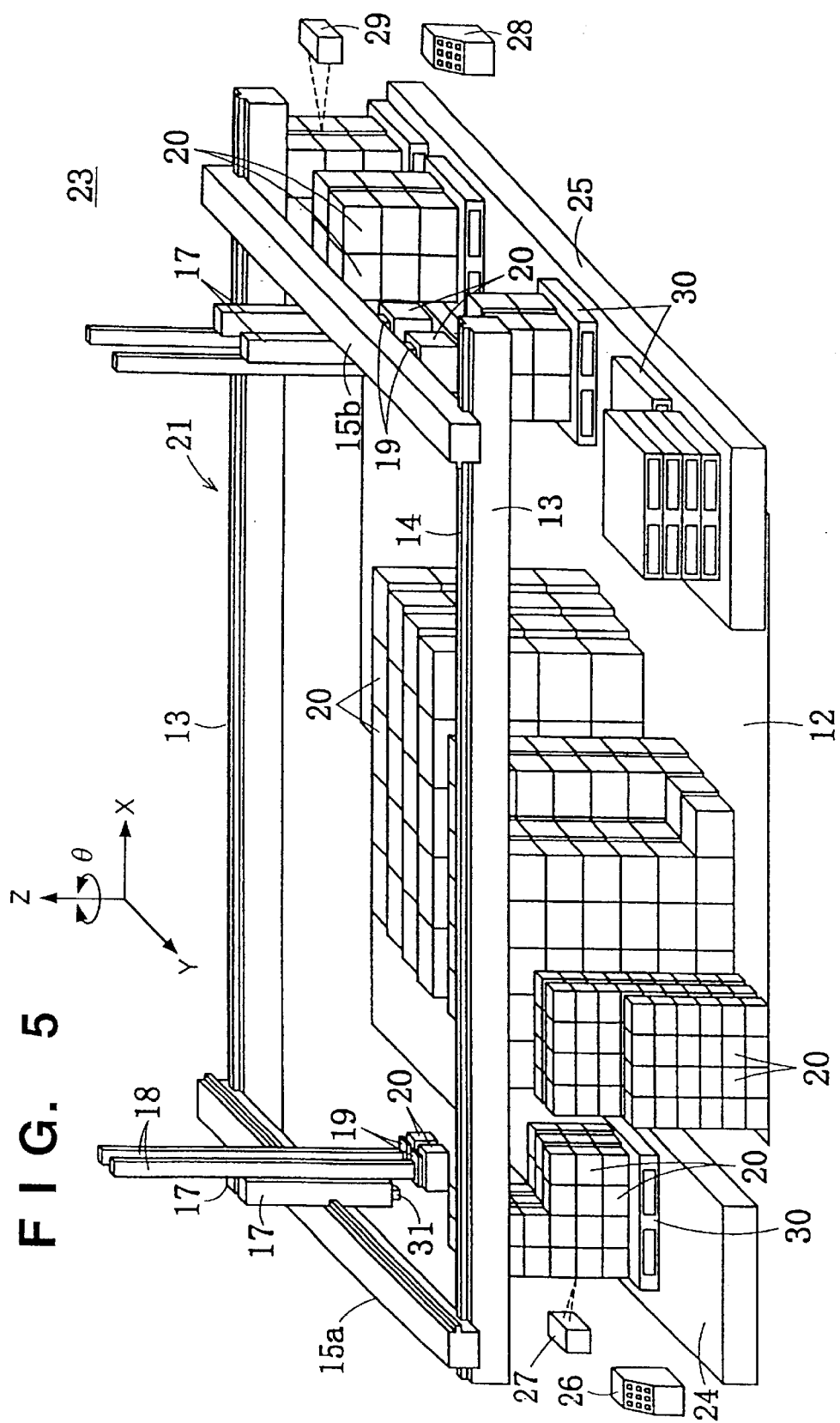
FIG. 5 is a perspective view showing the structure of an automated warehouse according to another embodiment of the present invention.

FIG. 5 is a schematic perspective view showing the structure of an automated warehouse 23 according to another embodiment of the present invention. In the automated warehouse 23, a loading area 24 and unloading area 25 are set on the two sides of a stocking area 12. In the loading area 24, a loading information input unit 26 (an input terminal of a management computer 22) is prepared to input the types, quantities, and the like of stock objects 20 to be loaded. Instead of the loading information input unit 26, a loading-side stock object discrimination unit 27 may be installed in the loading area 24 to manage a loading state by optically reading bar codes, imprints, markings, ID codes, or the like affixed to the stock objects 20. Alternatively, both the loading information input unit 26 and the loading-side stock object discrimination unit 27 may be prepared. Likewise, in the unloading area 25, an unloading information input unit 28 (an input terminal of the management computer 22) is prepared to input the types, quantities, and the like of stock objects 20. Instead of the unloading information input unit 28, an unloading-side stock object discrimination unit 29 may be installed in the unloading area 25 to manage an unloading state by optically reading bar codes, imprints, markings, ID codes, or the like affixed to the stock objects 20. Alternatively, both the unloading information input unit 28 and the unloading-side stock object discrimination unit 29 may be installed. The management computer 22 manages the loading/unloading information about the stock objects 20 which are input from the loading information input unit 26 and unloading information input unit 28, or the loading/unloading information about the stock objects 20 which are detected by the loading-side stock object discrimination unit 27 and unloading-side stock object discrimination unit 29.

Two movable beams 15a and 15b are supported between two parallel fixed beams 13 placed above the loading area 24, stocking area 12, and unloading area 25. The loading-side movable beam 15a and unloading-side movable beam 15b independently travel along the fixed beams 13. A plurality of elevating units 17 are mounted on a side surface of each of the loading-side movable beam 15a and unloading-side movable beam 15b. The respective elevating units 17 independently travel along the movable beams 15a and 15b. Each elevating unit 17 has a holding unit 18 for holding the stock object 20. The holding unit 18 is raised/lowered by the elevating unit 17. Note that the holding heads 19 of the respective holding units 18 mounted on the movable beams 15a and 15b may differ in their types (holding schemes). In addition, the holding head 19 of the holding unit 18 can turn about the vertical axis. The angle of the stock object 20 can be accurately controlled by numerically controlling the turning angle of the holding head 19. This allows a transfer unit 21 to have the functions of a palletizer and de-palletizer.

The automated warehouse 23 includes an image recognition unit 31 (vision system), posture sensor, or the like which recognizes the posture or position of the stock object 20 placed in the loading area 24, stocking area 12, or unloading area 25, the posture (angle) or the like of the stock object 20 held by the holding unit 18, or the like. The camera of the image recognition unit 31, posture sensor, or the like may be mounted on the elevating unit 17 or holding unit 18, and may be installed in the loading area 24 or the like.

Although no shown, a means for loading the stock object 20 is installed in the loading area 24. The means for loading the stock object 20 into the loading area 24 is not specifically limited, and an arbitrary means can be used in accordance with the form of the stock objects 20. For example, a conveyor, forklift, unmanned truck (unmanned train), and the like are used. The stock objects 20 may be conveyed as products and parts without any packing (bare) or in storing cases by these loading means. Alternatively, the stock objects 20 may be stacked on a conveyor pallet 30, as shown in FIG. 5. When the stock objects 20 are stacked on the conveyor pallet 30, for example, a plurality of products, parts, and the like as the stock objects 20 may be palletized on the pallet 30 or cases may be stacked on each other on the pallet 30. The stock objects 20 in various forms are loaded into the loading area 24 by the convey means, and the transfer unit 21 transfers the stock objects 20 to the picking positions.

More specifically, in a general production plant, e.g., a car tire plant, the stock objects 20 to be handled are bare tires. In a TV production plant, cardboard boxes containing TV sets are handled. In a drinking water plant, cases (containers) containing water-filled bottles are handled. As described above, in a production plan, stock objects are generally handled in a uniform form (packing) in the process to final products. In some plant, a production line is directly connected to the automated warehouse 23 through a conveyor, or stock objects are conveyed from a production line to the automated warehouse 23 through a convey means such as a forklift. Even when such a forklift is used, a conveyor is often used as a means for conveying the stock objects 20 to the loading area 24 in the automated warehouse 23. The stock objects 20 conveyed by the forklift are put on the pallet 30. The stock objects 20 conveyed from the production line to the automated warehouse 23 by the forklift are transferred from the forklift onto the conveyor, and are further conveyed to the picking position in the loading area 24 by the conveyor.

When each stock object 20 is conveyed to the picking position by the conveyor, type discrimination information in the form of a bar code, imprint, marking, ID code, or the like is read by the loading-side stock object discrimination unit 27. When the stock objects 20 are conveyed while stacked on each other on the pallet 30 or the like to be conveyed by the forklift, the loading-side stock object discrimination unit 27 discriminates the type of each stock object 20, and the image recognition unit 31 or posture sensor detects the posture or position of each stock object 20. The holding head 19 of the holding unit 18 is then moved or turned (in the θ direction in FIG. 5) in accordance with the position and angle of the stock object 20, thereby reliably picking the stock object 20.

The loading information input unit 26 that is manually operated to input type information, a quantity, and the like can be effectively used when information such as the type and quantity of stock objects 20 cannot be automatically read or discriminated by the loading-side stock object discrimination unit 27, image recognition unit 31, and the like.

Figure 6A:
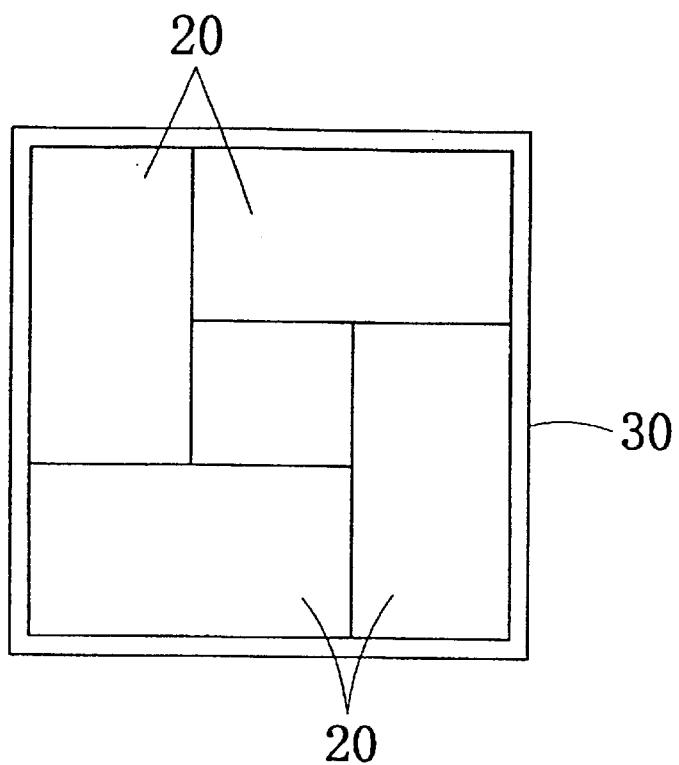
FIG. 6A is a plan view showing stock objects placed on a pallet.
Figure 6B:
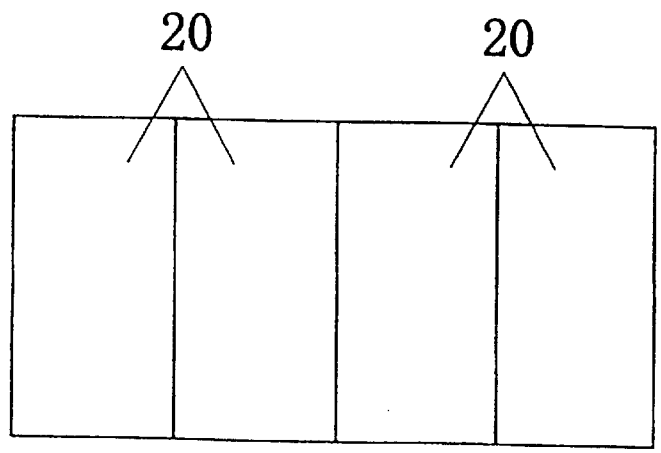
FIG. 6B is a plan view showing the stock objects stored in the stocking area.

When information about the stock object 20 is acquired in the loading area 24, the transfer unit 21 on the loading side causes the holding unit 18 to hold the stock object 20 at the picking position in the loading area 24, and turns the holding head 19 to correct the posture of the stock object 20 in accordance with the shape of the stocking area 12. At this time, the management computer 22 changes the loading position of the stock object 20 in the stocking area 12, as needed, in accordance with the available space in the stocking area 12 (by, for example, turning the holding head 19 through 90°), thus effectively using the available space in the stocking area 12. More specifically, when the four stock objects 20 are placed on the pallet 30 in the form shown in FIG. 6A, if they are stored without changing their postures, a space is produced in the center of them. In order to store the stock objects 20 in the form shown in FIG. 6B, therefore, the management computer 22 stores the two stock objects 20 without changing their postures, but stores the two remaining stock objects 20 in the stocking area 12 upon turning them through 90°, thereby storing the four stock objects 20 side by side in the stocking area 12. When the stock objects 20 are stored as shown in FIG. 6B, the available space in the stocking area 12 can be effectively used, and wrapping and taping for shipment are facilitated. This makes it possible to suppress load falling.

The holding unit 18 on the loading side picks the stock objects 20 one by one and carries them to the stocking area 12. The holding unit 18 then stacks each stock object 20 flat or on another stock object at the position designated by the management computer 22. When all the stock objects 20 put on the pallet 30 are conveyed to the stocking area 12, the empty pallet 30 is conveyed to the discharging position.

Conveyance of the stock objects 20 from the stocking area 12 to the unloading area 25 will be described next. When the management computer 22 receives an unload request, the holding unit 18 on the unloading side transfers the stock objects 20 of the requested type to the unloading area 25 by the requested number on the basis of the load request.

The unloading area 25 is equipped with a plurality of lanes and conveyors. The stock objects 20 are put one by one on each lane or conveyor for each destination, thereby assorting the stock objects 20 according to the respective destinations. Alternatively, the stock objects 20 may be assorted on the respective lanes and conveyors according to types, or stacked on each other according to the types. In addition, in the unloading area 25, a plurality of types and numbers of stock objects 20 may be loaded into a container altogether. Furthermore, in the unloading area 25, the stock objects 20 may be palletized on a shipment pallet 30 (mainly forklift pallet 30).

Of these forms, the palletized form, in which a plurality of types of stock objects 20 are stacked on the forklift pallet 30, demands the most complicated and difficult technical tasks. According to this automated warehouse 23, therefore, palletizing operation is performed as follows. Type attribute data such as the length, width, and height of each stock object 20 and an allowable weight by which stock objects can be stacked on each other, and an allowable height by which stock objects can be palletized on each other, and flat surface limit values are stored in a control computer for palletizing operation. Software for a palletization simulation is installed in this control computer, and the stacking order and positions of the stock objects 20 are automatically determined by the control computer. The determination result is graphically displayed. In addition, when the stock objects 20 are to be separately placed on several pallets 30, several feasible palletization candidates can be graphically displayed. It is important in palletizing operation to stack stock objects while keeping them in balance without causing load falling or the like. The operator watches a graphically displayed simulation result to evaluate the displayed candidate, and corrects it, as needed.

By managing palletizing operation in this manner with the computer having the simulation function, stock objects can be automatically unloaded or palletized in response to a simple load request. If complicated palletizing operation is required, the operator can correct the simulation result obtained by the management computer 22, and can handle various load requests in advance, thus implementing efficient loading operation. The operator can perform such simulation operation and control operation in a stocking site from a remote management room or the like, instead of the installation site of the automated warehouse 23. In this case, a camera or the like is preferably installed to monitor palletizing operation.

In this embodiment, since the transfer unit 21 has the movable beams 15a and 15b on the loading and unloading sides, loading and unloading operations can be simultaneously executed by exclusively using the loading-side movable beam 15a for loading operation, and the unloading-side movable beam 15b for unloading operation. This can improve the loading/unloading efficiency. In addition, since the transfer unit 21 has the two movable beams 15a and 15b, when one of the movable beams 15a and 15b fails, loading/unloading operation can be continued with the other of the movable beams 15a and 15b if the faulty movable beam 15a or 15b is moved backed to an end of the fixed beam 13.

In addition, in this embodiment, since a plurality of holding units 18 are mounted on each of the movable beams 15a and 15b, a plurality of holding units 18 having different holding mechanisms can be mounted on each of the movable beams 15a and 15b. The holding unit 18 having a holding mechanism suitable for the stock object 20 can be selected to reliably hold the stock object 20 in accordance with the type, shape, size, and the like of the stock object 20. If the plurality of holding units 18 of the movable beam 15 have the same holding mechanism, a plurality of stock objects 20 can be simultaneously conveyed. Alternatively, one holding unit 18 may be used to hold a small stock object 20, and a plurality of holding units 18 may be used to hold a large stock object 20. Furthermore, when a plurality of identical holding units 18 are mounted on each of the movable beams 15a and 15b, if some holding units 18 fail, the remaining holding units 18 can substitute for them.

Third Embodiment

Figure 7:
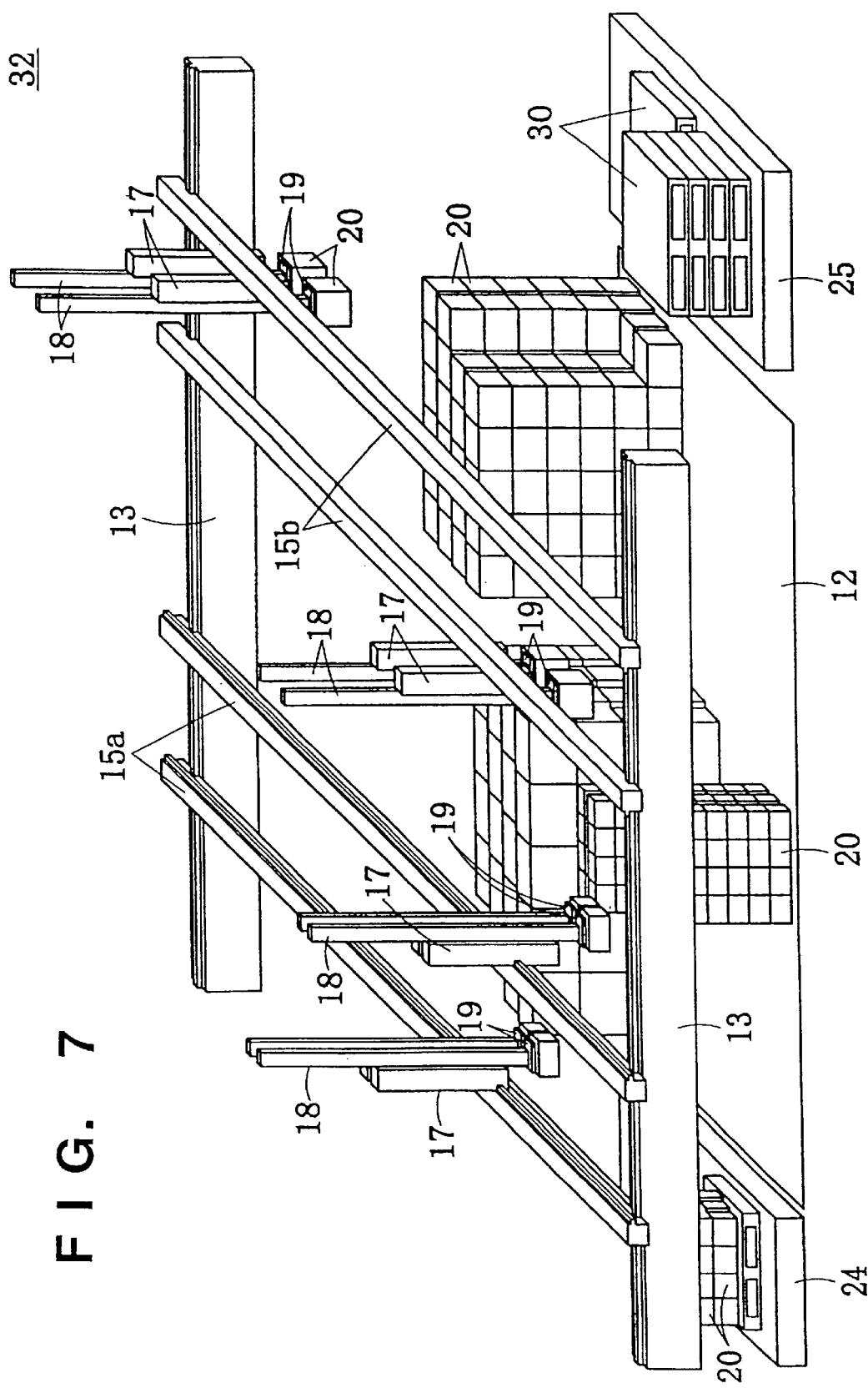
FIG. 7 is a perspective view showing the structure of an automated warehouse according to still another embodiment of the present invention.

FIG. 7 is a schematic perspective view showing an automated warehouse 32 according to still another embodiment of the present invention. In this embodiment, two loading-side movable beams 15a and two unloading-side movable beams 15b are supported between two fixed beams 13 placed above the space in the stocking area 12. The respective movable beams 15a and 15b are designed to independently travel. In addition, two elevating units 17 are mounted on each of the movable beams 15a and 15b to travel along the movable beams 15a and 15b. Holding units 18 are mounted on the respective elevating units 17 to be vertically movable.

Figure 8A:
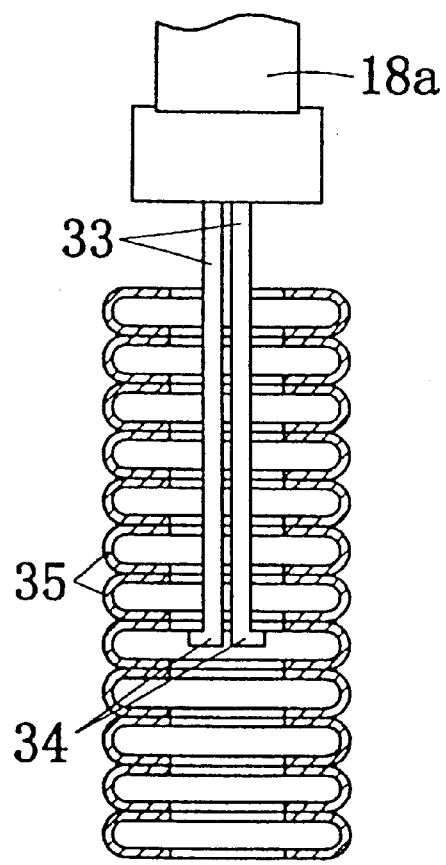
FIGS. 8A and 8B are views for explaining how tires are lifted by an opening/closing chuck (holding unit)
Figure 8B:
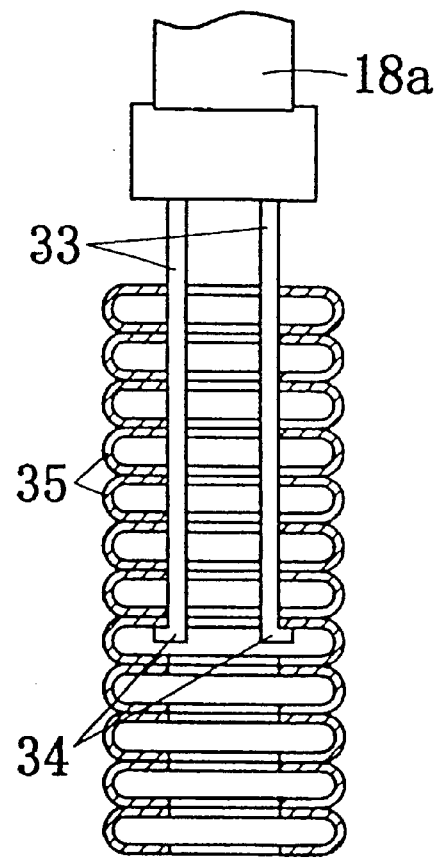

FIGS. 8A and 8B show an opening/closing chuck 18a as an example of the holding unit 18. Pawls 34 extend from the lower ends of two sticks 33 that can spread apart. For example, this unit is used to hold an automobile tire. When the sticks 33 are inserted in the middle of one of tires 35 stacked on each other while the gap between the sticks 33 is reduced, as shown in FIG. 8A, and the sticks 33 are spread apart at the position of the lowermost one of the tires 35 to be lifted, the pawls 34 are hooked on the tire 35, as shown in FIG. 8B. As a consequence, a plurality of tires 35 can be held by one opening/closing chuck 18a at once while being guided. In contrast to this, when the tires 35 lifted and conveyed with the opening/closing chuck 18a are put on the floor surface of the stocking area 12 or in an unloading area 25, and the gap between the sticks 33 is reduced as shown in FIG. 8B, the sticks 33 can be released from the tire 35.

Figure 9:
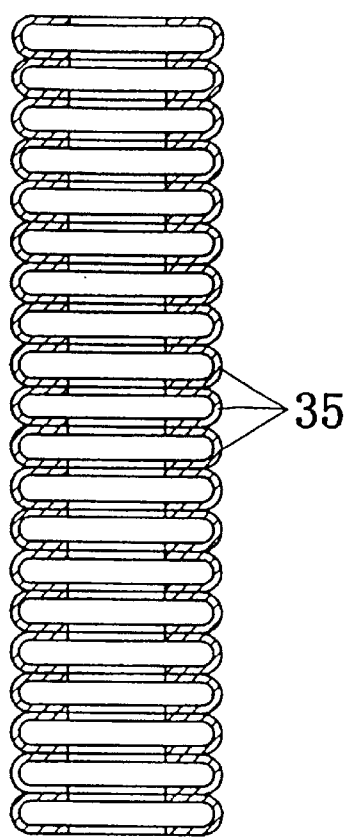
FIG. 9 is a sectional view showing stacked tires.
Figure 10:
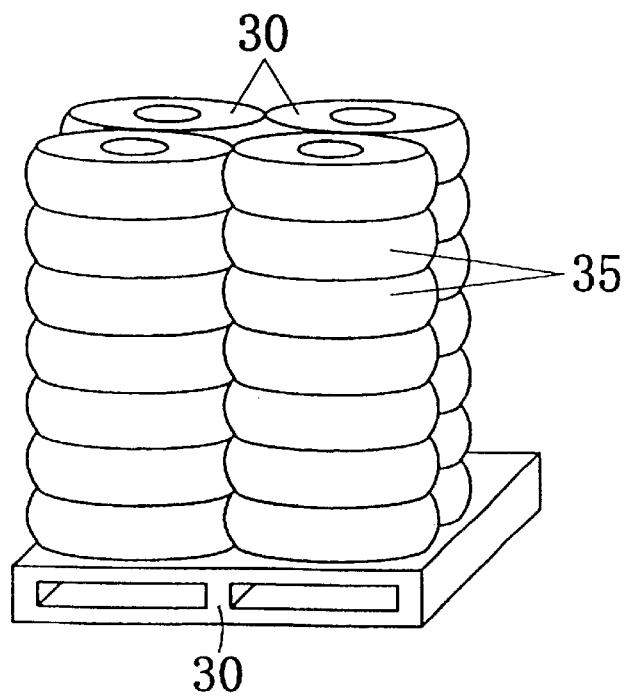
FIG. 10 is a perspective view showing tires placed on a pallet.

In this embodiment, since the tires 35 can be held with the four holding units 18 mounted on the two movable beams 15a and 15b, if a predetermined number of tires 35, of the tires stacked high as shown in FIG. 9, are held with each opening/closing chuck 18a, a large number of tires 35 can be quickly conveyed to the stocking area 12 by one transfer operation. In contrast to this, many tires can be quickly conveyed from the stocking area 12 onto a pallet 30 in the unloading area 25 by one transfer operation. In addition, the tires 35 can be placed on the pallet 30 in the stocking area 12 or unloading area 25 without any unnecessary gaps, as shown in FIG. 10, thus realizing space-saving storage.

Since this embodiment uses extendible, low-profile, long-stroke elevating mechanisms such as elevating mechanisms of a telescopic scheme that can slide stepwise or multistage cross-link mechanism, the space in even a low-ceilinged automated warehouse can be effectively used.

Fourth and Fifth Embodiments

Figure 11:
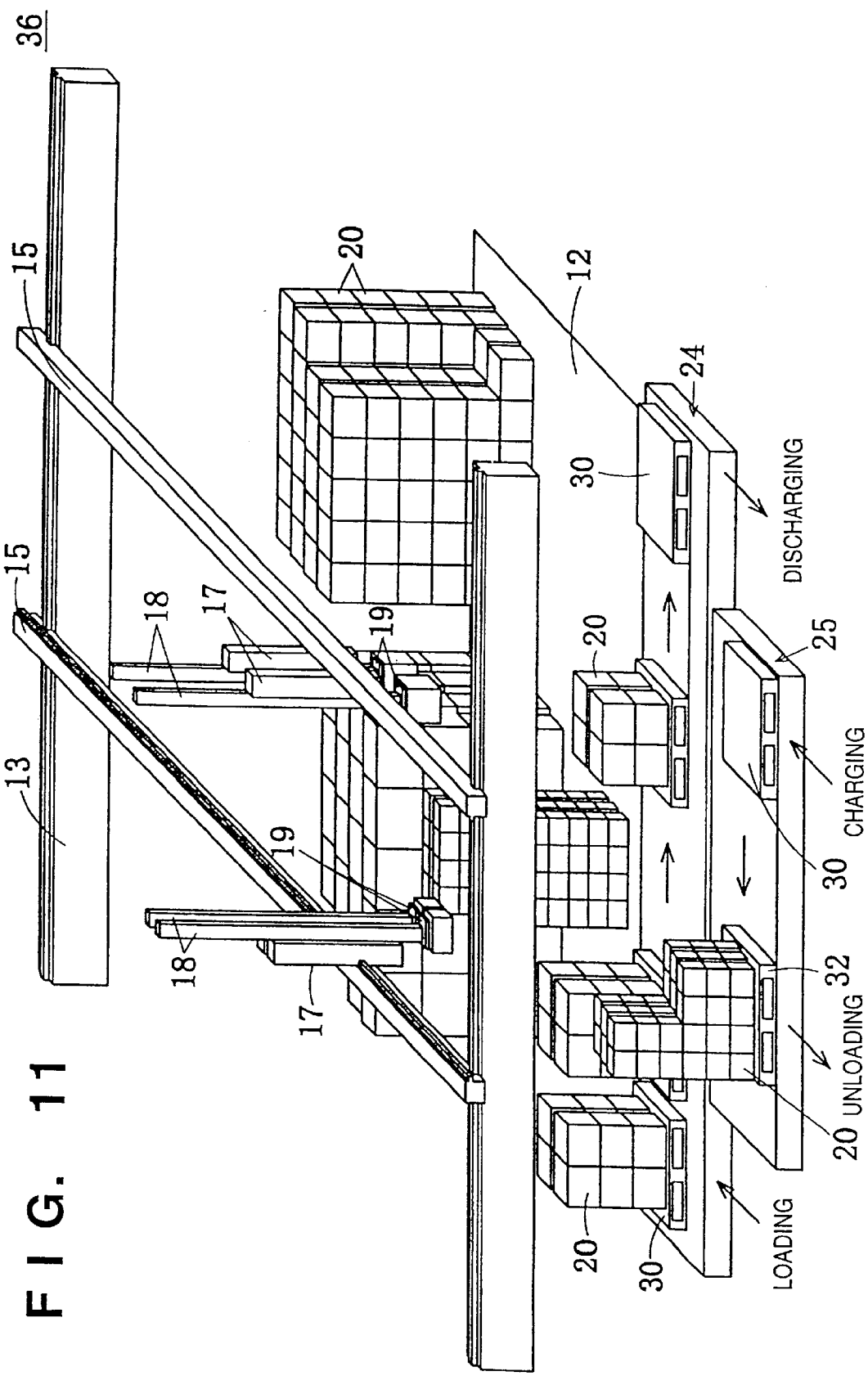
FIG. 11 is a perspective view showing the structure of an automated warehouse according to still another embodiment of the present invention.

FIG. 11 is a schematic perspective view showing an automated warehouse 36 according to still another embodiment of the present invention. In this embodiment, a loading area 24 and unloading area 25 are set to be parallel to each other along one side of a stocking area 12.

Figure 12:
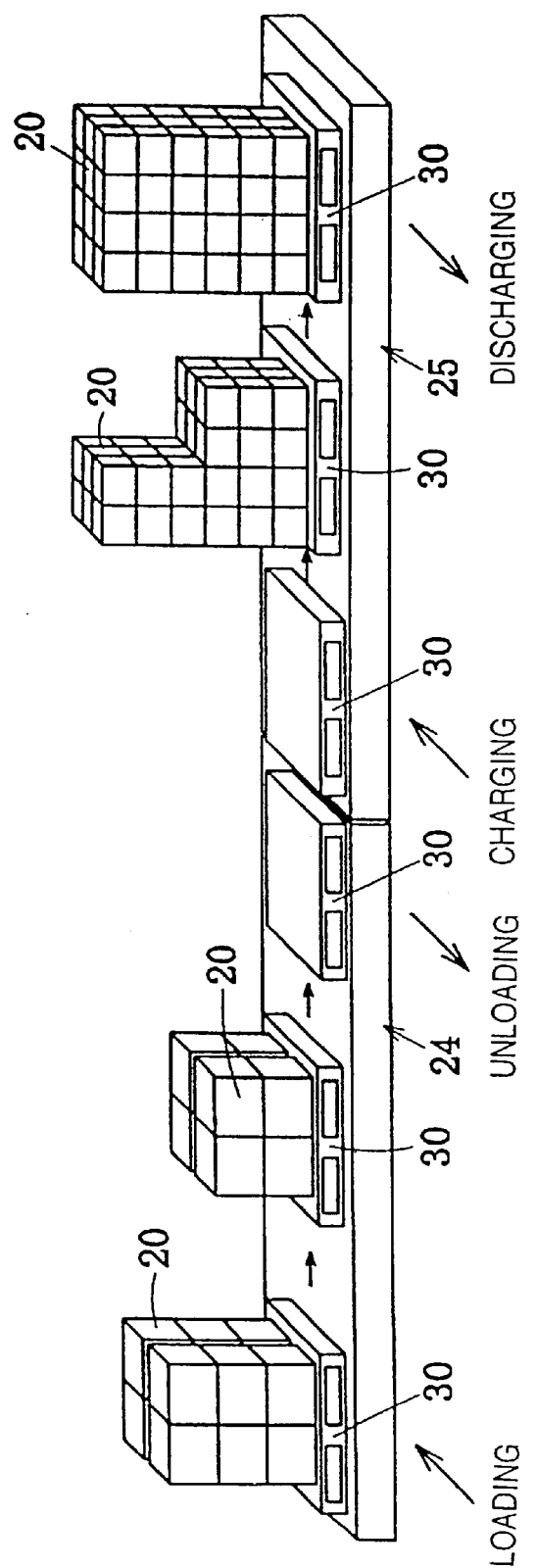
FIG. 12 is a perspective view showing the structures of loading and unloading areas in an automated warehouse according to still another embodiment of the present invention.
Figure 13:
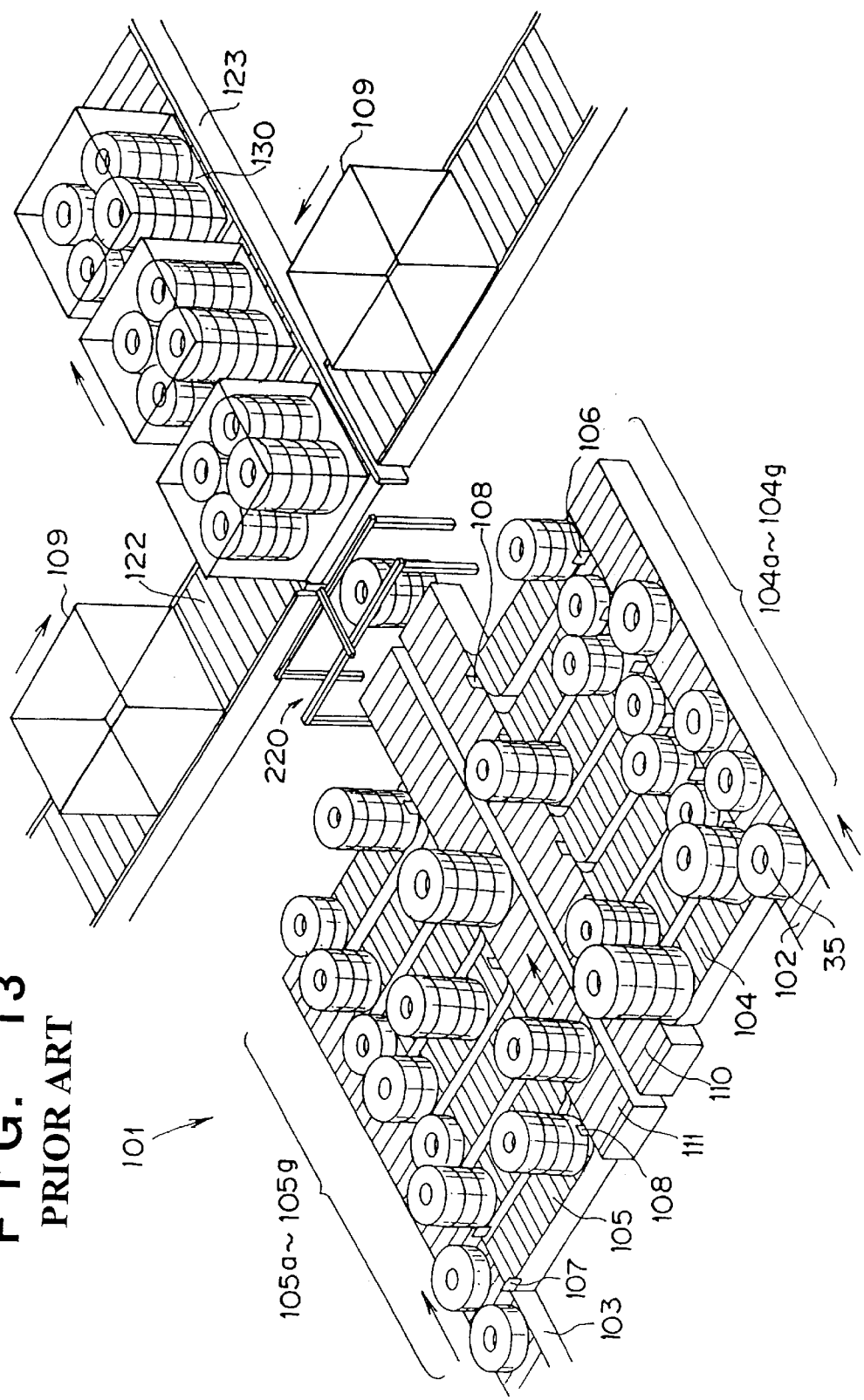
FIG. 13 is a perspective view showing an example of a conventional tire assorting unit.

FIG. 12 is a schematic perspective view showing a loading area 24 and unloading area 25 in an automated warehouse according to still another embodiment of the present invention. The loading area 24 and unloading area 25 are set in a line along one side of a stocking area 12.

As in these embodiments, if the loading area 24 and unloading area 25 are arranged to be adjacent to each other, loading and unloading operations can be performed on one side of the stocking area 12 in the form of, e.g., a rectangle, and stock objects can be stocked along the three remaining sides up to positions near walls of the automated warehouse 36. This makes it possible to effectively use the automated warehouse. FIGS. 11 and 12 show loading/unloading operation in which many stock objects are stacked on pallets 30. However, a conveyor designed to convey stock objects one by one or a plurality of conveyors may be used.

A case wherein the present invention is applied to tires formed by molding as stock objects will be described next in detail.

As is known, in a tire molding process as a previous process, various types of tires with various sizes are manufactured by using many tire molding apparatuses. The tires manufactured in this manner are randomly placed on a conveyor and loaded into an automated warehouse after identification display. After the randomly loaded tires are assorted according to the types, they must be stacked on pallets and unloaded. An automated warehouse which can meet such an requirement will be described with reference to the perspective views of FIGS. 14 and 15.

Figure 14:
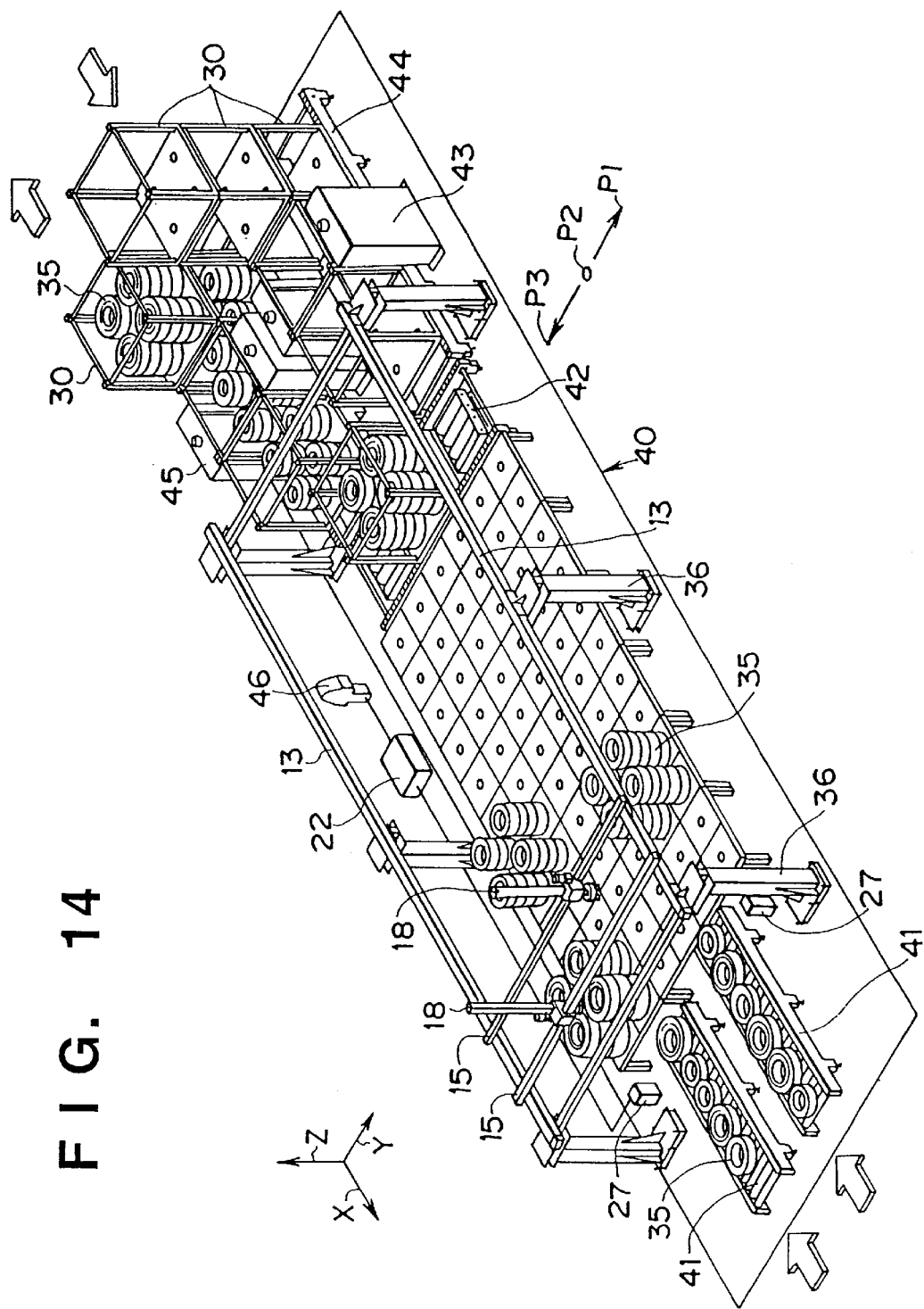
FIGS. 14 and 15 are perspective views of a line 40 in an automated tire warehouse.
Figure 15:
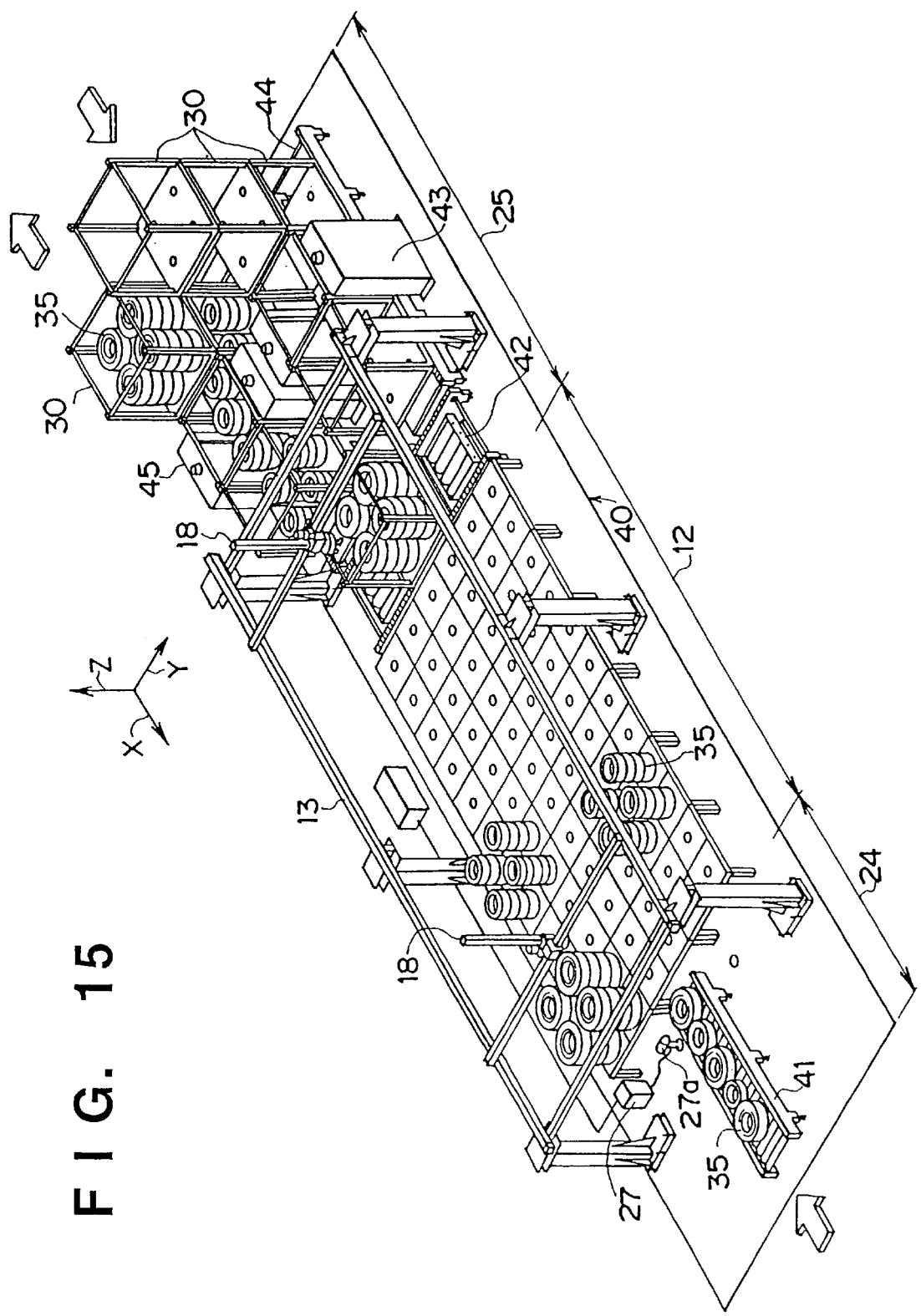

FIG. 14 shows how two loading conveyors 41 as loading convey means for loading various types of tires with various sizes are arranged in a loading area 24 along a line 40 in an automated warehouse for tires, and the movable beams 15, which travel on fixed beams 13 in the above manner, move to the loading area side. FIG. 15 shows almost the same structure as that shown in FIG. 14. FIG. 15 shows how only one loading conveyor 41 is placed in the loading area 24, and also shows how one movable beam 15 has moved to the unloading area 25 and the tire held with the holding unit 18 is transferred into the pallet 30 positioned at the transfer position of the transfer unit.

The same reference numerals in FIGS. 14 and 15 denote the same parts as those described above, and a description thereof will be omitted. Only a characteristic arrangement will be described below. One pair of fixed beams 13 described above are placed along the edge portions of the line 40 in the longitudinal direction to extend over part of the loading area 24, the stocking area 12, and part of the unloading area 25. Since the fixed beams 13 are supported on the upper end portions of a plurality of column members 36 in FIG. 14, holding units 18 in a retracted state can move on a plane at a predetermined height.

A discrimination unit 27 is arranged near an end portion of each loading conveyor 41. The discrimination units 27 perform noncontact detection of bar codes affixed to the tires 35 according to the respective tire types to identify the tires 35, and notify a management computer 22 as a control means of the identification results. A monitor unit 46 as a display means is connected to the management computer 22. The monitor unit 46 displays an address space (to be described later) to notify the operator of the stocked state of tires stacked on each other in a real space in the stocking area.

As shown in FIGS. 14 or 15, the stocking area 12 is divided into small spaces according to various types and sizes, and these spaces are arranged as real stocking spaces in the form of a matrix, in each of which tires of the same type are stacked on each other. This arrangement eliminates waste of space.

A pallet conveyor 44 is disposed in a pallet loading section arranged in the unloading area 25 in FIG. 15 to load the empty pallets 30 in a stacked state as shown in FIG. 15. With this conveyor, the empty pallets 30 are loaded from the direction indicated by the double arrow in FIG. 15, and are conveyed to a transfer conveyor 42 after the pallets 30 are dismounted one by one by an empty pallet stacking unit 43. A pallet conveyor 44 (not shown) is also disposed in a pallet unloading section for unloading tire-loaded pallets on which tires are stacked on each other. With this conveyor, the tire-loaded pallets 30 can be unloaded from the direction indicated by the double arrow in FIG. 15, and can be unloaded after they are stacked on each other by a loaded pallet stacking unit 45 as shown in FIG. 15.

Referring to FIG. 14, the transfer conveyor 42 serves as a slat conveyor that moves between an empty pallet supply position P1, a transfer position P2 at which stacked tires are transferred, and a position P3 at which a tire-loaded pallet is transferred toward the loaded pallet stacking unit 45. The transfer conveyor 42 is designed to convey an empty pallet on this slat conveyor and move it upward with a roller conveyor function and elevating function.

Figure 16:
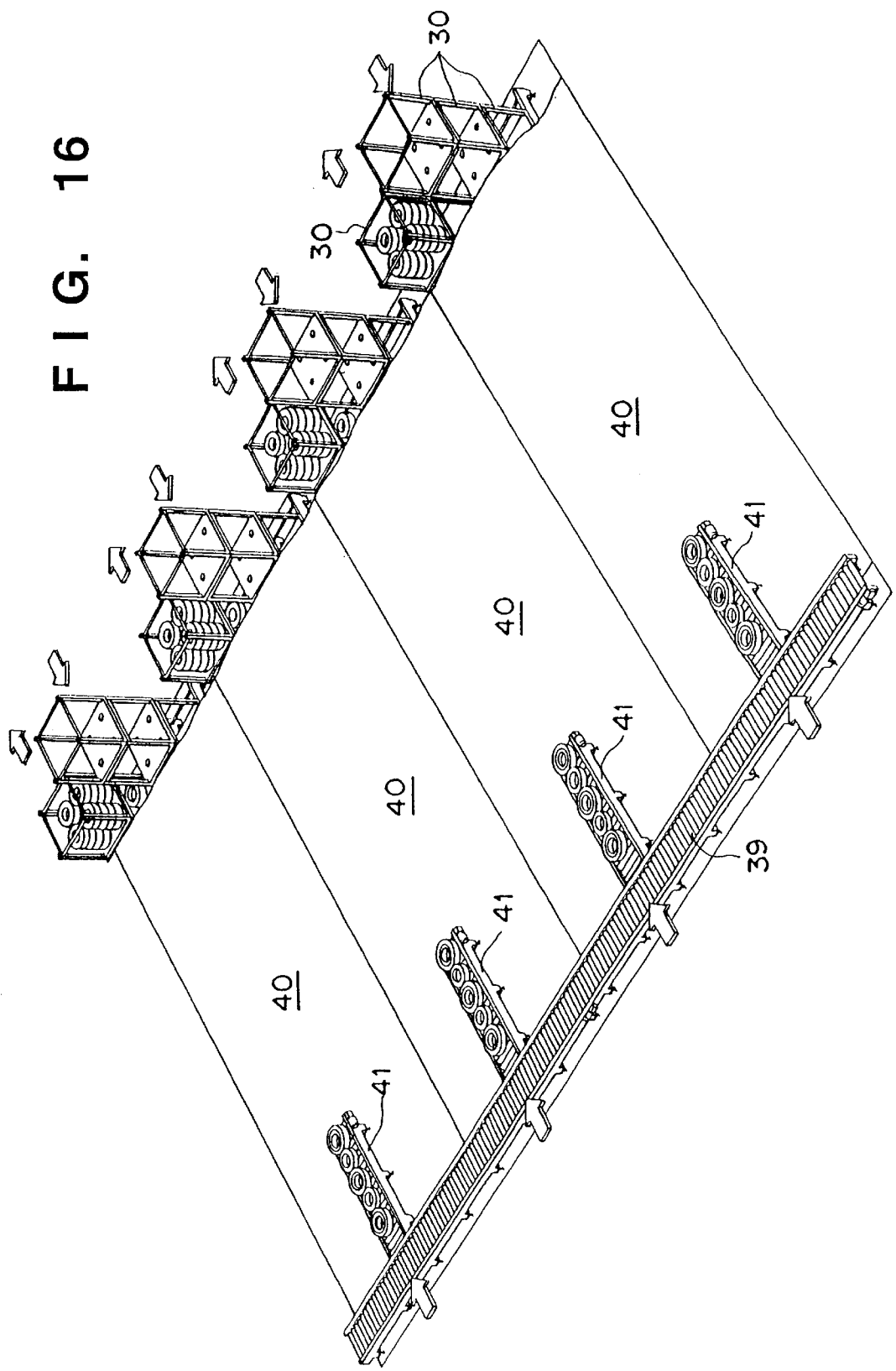
FIG. 16 is a perspective view showing how a plurality of lines 40 are arranged to branch from a common conveyor unit 39 as a common convey means.

FIG. 16 is a perspective view showing how a plurality of lines each identical to the line 40 having the above arrangement are arranged to branch from a common conveyor 39 as a common convey means. Referring to FIG. 16, various types of tires with various sizes manufactured in a tire molding process as a previous process are conveyed onto the common conveyor 39 first, and then randomly supplied to the respective loading conveyors 41 through gate mechanisms (not shown). In addition, the empty pallets 30 and tire-loaded pallet 30 are respectively loaded and unloaded in the directions indicated by the double arrows in FIG. 16.

When the lines 40 are systematically arranged to branch from the common conveyor 39 as the command convey means, the automated warehouse can flexibly cope with an increase/decrease in the number of lines. If, therefore, only a floor area is ensured in line installation, for example, one line 40 may be installed in the initial stage of investment, and lines 40 can be added afterward, as needed, in accordance with a plan for increasing the production.

Figure 17:
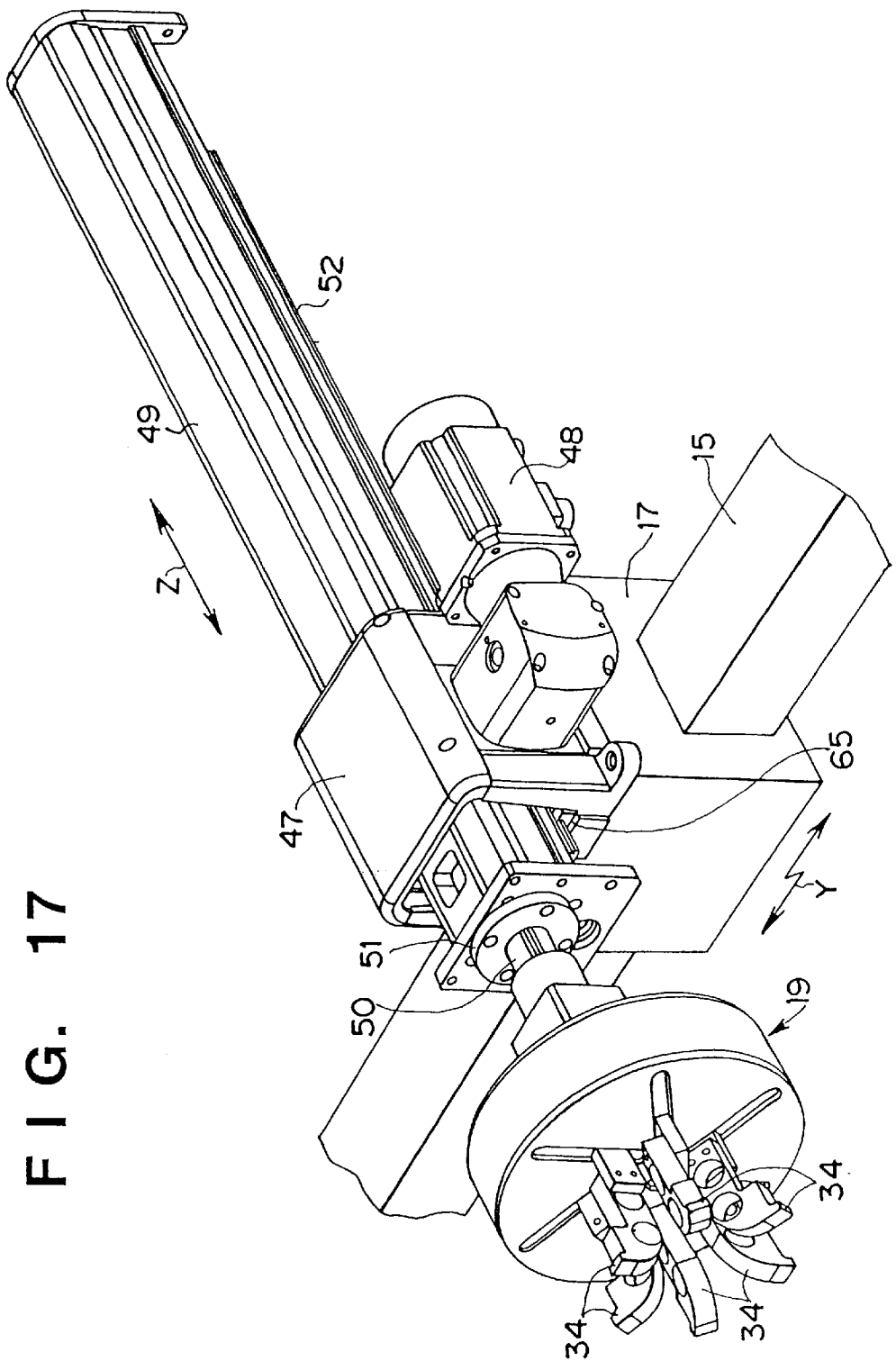
FIG. 17 is a perspective view showing a holding unit mounted on an elevating unit 17.

FIG. 17 is a perspective view showing a holding unit mounted on the elevating unit 17 described above. FIG. 17 is a cutaway view of the movable beam 15. Referring to FIG. 17, the elevating unit 17 has a motor driving unit (not shown) to move in the longitudinal direction of the movable beam 15.

A base 47 is fixed on the elevating unit 17. A motor 48 having a gear head is fixed on the base 47. A through hole is formed in the base 47 as shown in FIG. 17. A beam member 49 can move through this through hole while extending therethrough and is made slidable along a linear guide 65. A rack 52 meshed with a pinion fixed to the output shaft of the above gear head is fixed on a side surface of the beam member 49 to extend along the longitudinal direction.

A spline bearing 51 for slidably guiding a spline shaft 50 while restricting its pivotal movement is fixed on the lower end of the beam member 49. The above holding head 19 is fixed on the lower end of the spline shaft 50. As described with reference to FIGS. 8A and 8B, six pawls 34 for holding the tire 35 from its inner diameter side are arranged at equal intervals on the holding head 19 as shown in FIG. 17.

With the above arrangement, the holding head 19 is moved in the direction indicated by an arrow Y and raised in the direction indicated by an arrow Z to hold the desired tires 35 one by one from the loading conveyor 41, convey it to the stocking area, and place it in the stocking area upon releasing it, as described with reference to FIG. 8A and 8B. The holding head 19 also holds the tire at the lowermost position, lifts the tires in a stacked state, and conveys them toward the pallet transfer unit 42, as shown in FIG. 8A and 8B. Alternatively, only one tire maybe held and conveyed with the pawls shown in FIG. 17.

Figure 18A:
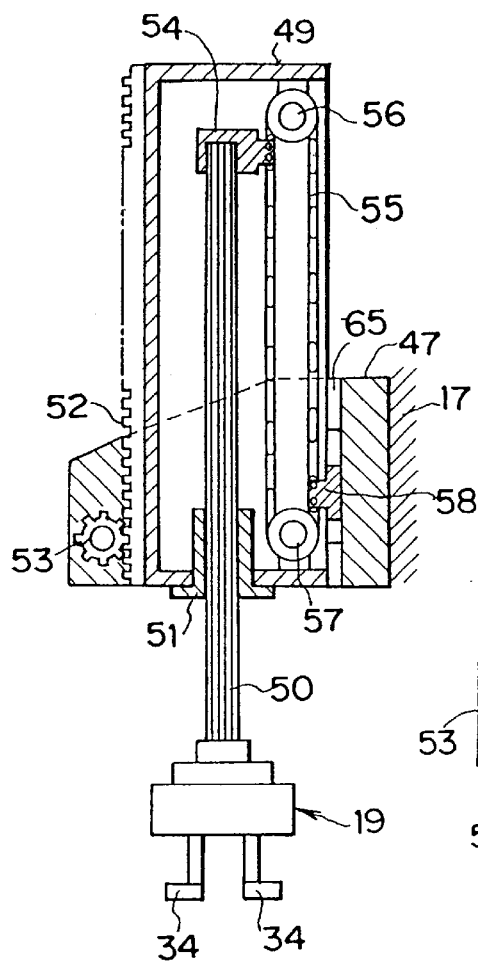
Figure 18B:
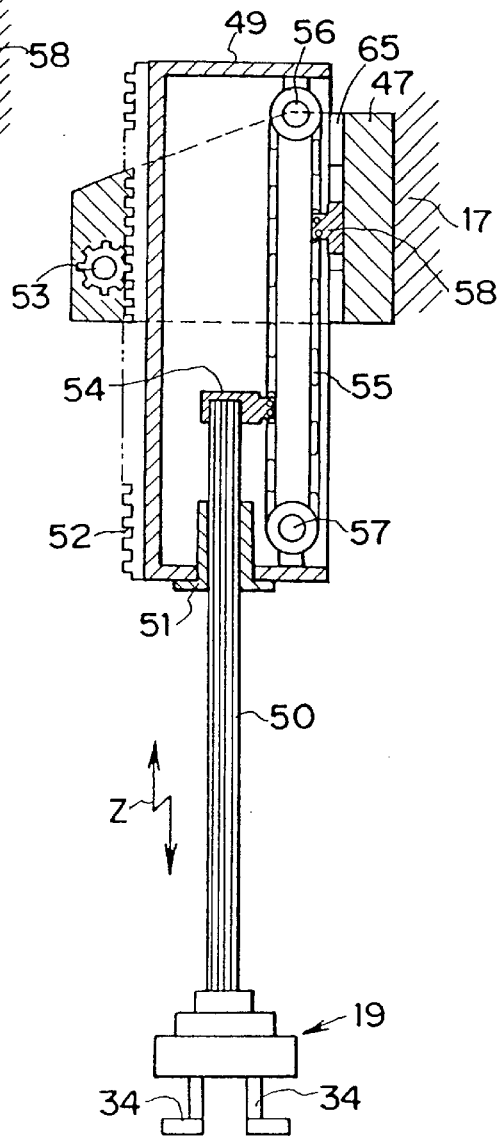

This holding head 19 may have a double-speed mechanism to shorten the time required for elevating operation. FIG. 18A is a sectional view showing the internal structure of the double-speed mechanism. FIG. 18A shows a retracted state. FIG. 18B shows an extended state.

Referring to FIGS. 18A and 18B, a pinion 53 of the gear head motor fixed to the base 47 described with reference to FIG. 17 is meshed with the rack 52. As the motor driven clockwise or counterclockwise, the beam member 49 is moved up or down. The beam member 49 incorporates an upper chain sprocket 56 pivotally held on the upper end, and a lower chain sprocket 57 pivotally held on the lower end. In addition, a chain 55 is looped on these sprockets. One side of the chain 55 is fixed to the upper end of the spline shaft 50 through a chain fixing member 54 fixed to the upper end of the spline shaft 50, and the other side of the chain 55 is fixed to the base 47 through a base fixing member 58 fixed to the base 47. With this structure, as the pinion 53 pivots, the spline shaft 50 moves in the direction indicated by an arrow Z at a speed twice the moving speed of the beam member with a stroke twice that of the beam member.

Figure 19:
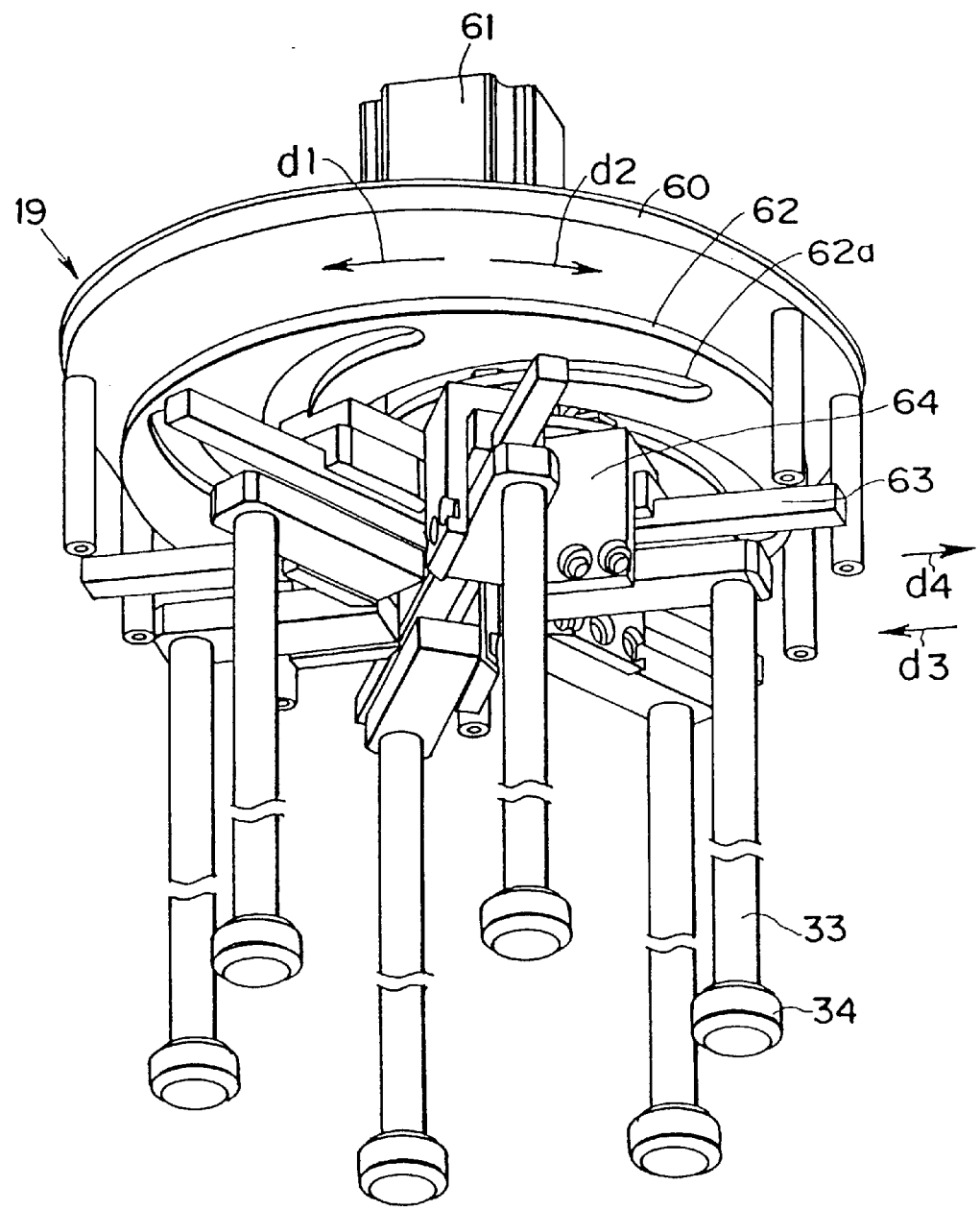
FIG. 19 is a perspective view showing an uncovered holding head 19.

FIG. 19 is a perspective view showing the uncovered holding head 19. Referring to FIG. 19, the holding head 19 has a disk 62 pivoted in the directions indicated by arrows d1 and d2 by a motor 61 mounted on a disk-like base 60 serving as a base portion on which the spline shaft 50 is mounted as described above, and six groove portions 62a helically and radially formed in the disk 62.

In addition, six slide guides 63 are radially fixed at equal intervals on the base 60. Each slide guide 63 movably guides a slider 64. Pin members (not shown) inserted in the groove portions 62a are fixed to the respective sliders 64. As the disk 62 pivots, the respective sliders 64 are driven in the directions indicated by arrows d3 and d4 in a perfect synchronous state, thereby moving the sticks 33 fixed on the respective sliders 64 by the same amount. With this operation, the six pawls on the distal ends of the sticks 33 move by the same amount. In this manner, the respective sliders are driven between the state in which the pawls 34 hold a tire from its inner diameter side and the state in which the pawls 34 release the tire. By holding the inner diameter portion of a tire with the sixpawls 34 in this manner, the tire can be stably moved in the horizontal direction.

Figure 20:
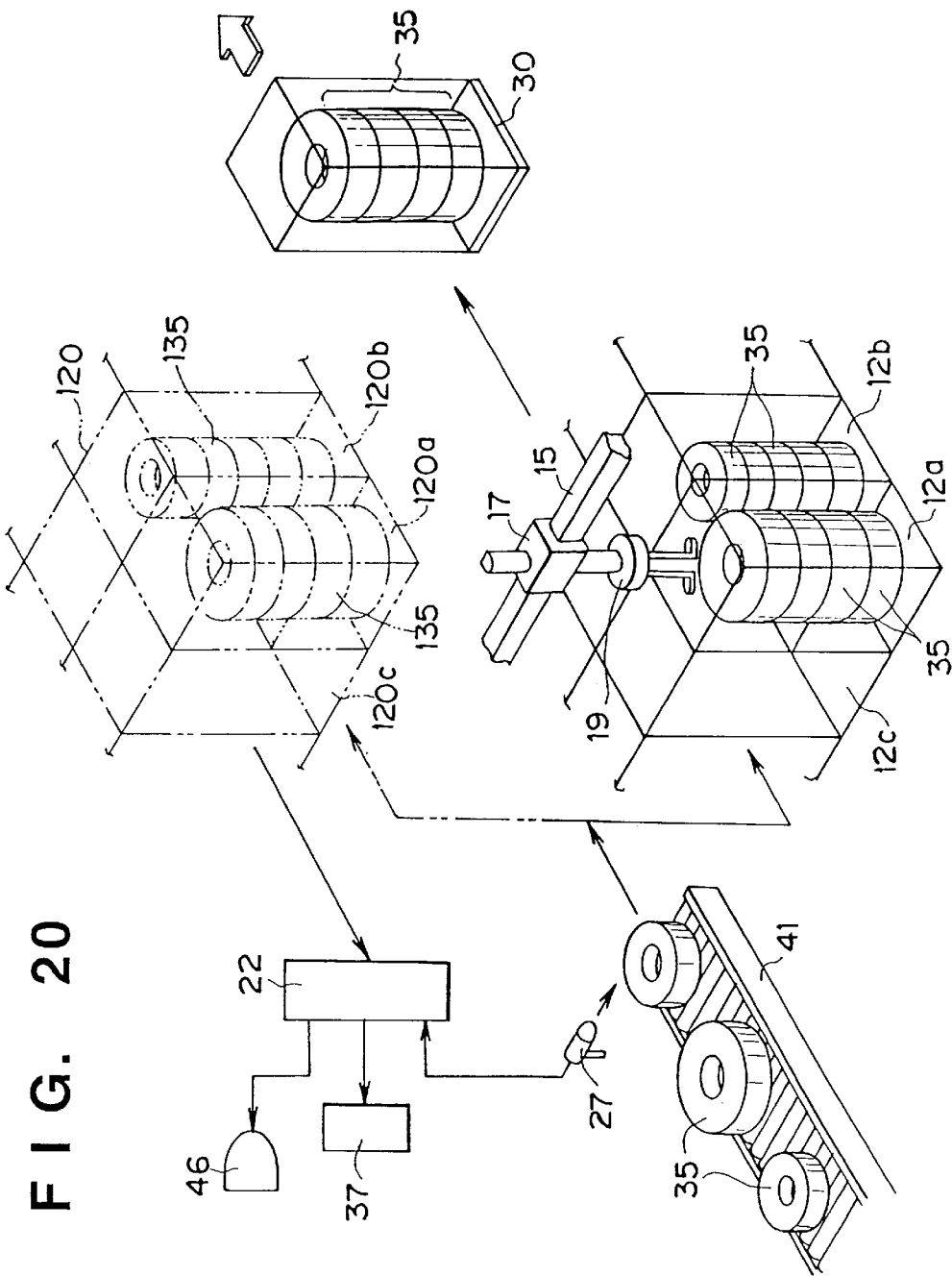
FIG. 20 is a view showing the relationship between real stocking spaces and an address space 120 stored in the management computer 22 as a control means in correspondence with the real stocking spaces.

FIG. 20 shows the relationship between an address space 120 stored in the management computer 22 as a control means in correspondence with a real stocking space and a plurality of real stocking spaces 12a, 12b, 12c, . . . assigned according to the respective types and sizes of stock objects in the stocking area 12 as shown in FIG. 20 to allow tires of the same type to be stacked on each other.

The same reference numerals in FIG. 20 denote the same parts as those described above, and a description thereof will be omitted. As the address space 120, virtual stocking spaces 120a, 120b, 120c, . . . are stored in correspondence with the real stocking areas 12a, 12b, 12c, . . . AS these virtual stocking areas 120a, 120b, 120c, . . . , the maximum numbers of stacks of stock objects are stored in accordance with the sizes of tires.

In the above arrangement, the real stocking spaces 12a, 12b, 12c, . . . are managed by updating the virtual address spaces 120a, 120b, 120c, . . . in accordance with the results obtained by identifying the tires 35 on the loading conveyor 41 with the cooperation of the elevating units 17 and holding heads 19 and the results obtained by performing unloading to pallets with the cooperation of the elevating units 17 and holding heads 19. With this operation, proper numbers of tires are stacked on each other in the real stocking spaces 12a, 12b, 12c, . . . .

Figure 21:
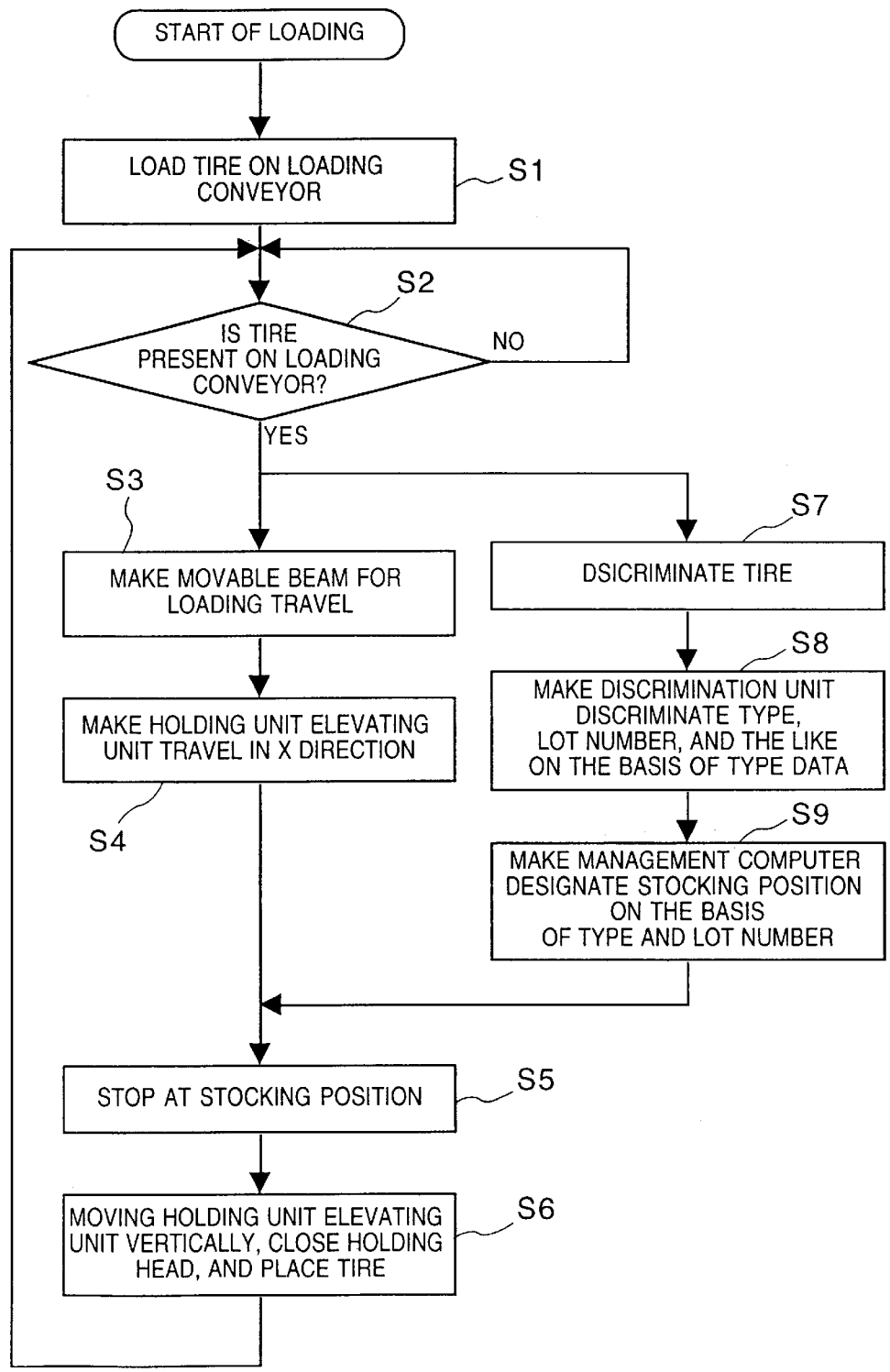
FIG. 21 is a flow chart showing an example of tire loading operation on the line 40.

FIG. 21 is a flow chart showing an example of tire loading operation on the line 40 having the above arrangement.

Referring to FIGS. 15 and 21, when a preparation for tire loading is made, a loading program is started. In step S1, the tire 35 is loaded through the loading conveyor 41. In step S2, the discrimination unit 27 detects the presence/absence of the tire 35. If no tire is detected, the flow returns. If a tire is detected, the flow advances to steps S3 and S7 almost simultaneously.

In step S3, the movable beam 15 is made to travel in the direction indicated by the arrow X, and the holding head 19 on the loading conveyor 41 to hold the tire. In step S4, the movable beam is moved, and the holding head 19 is made to travel in the direction indicated by the arrow Y and positioned/stopped at a predetermined stocking position (step S5). In step S6, the tire is released and placed. In step S7, the tire is discriminated. In step S8, the virtual address space is updated on the basis of the discrimination result. In step S9, the real stocking place of the held tire is determined on the basis of the result obtained in step S8. In this manner, the management computer manages the loading state by counting and updating the number of tires stacked on each other in the real stocking space, and determines the proper stocking position of the tire to be loaded next.

Figure 22:
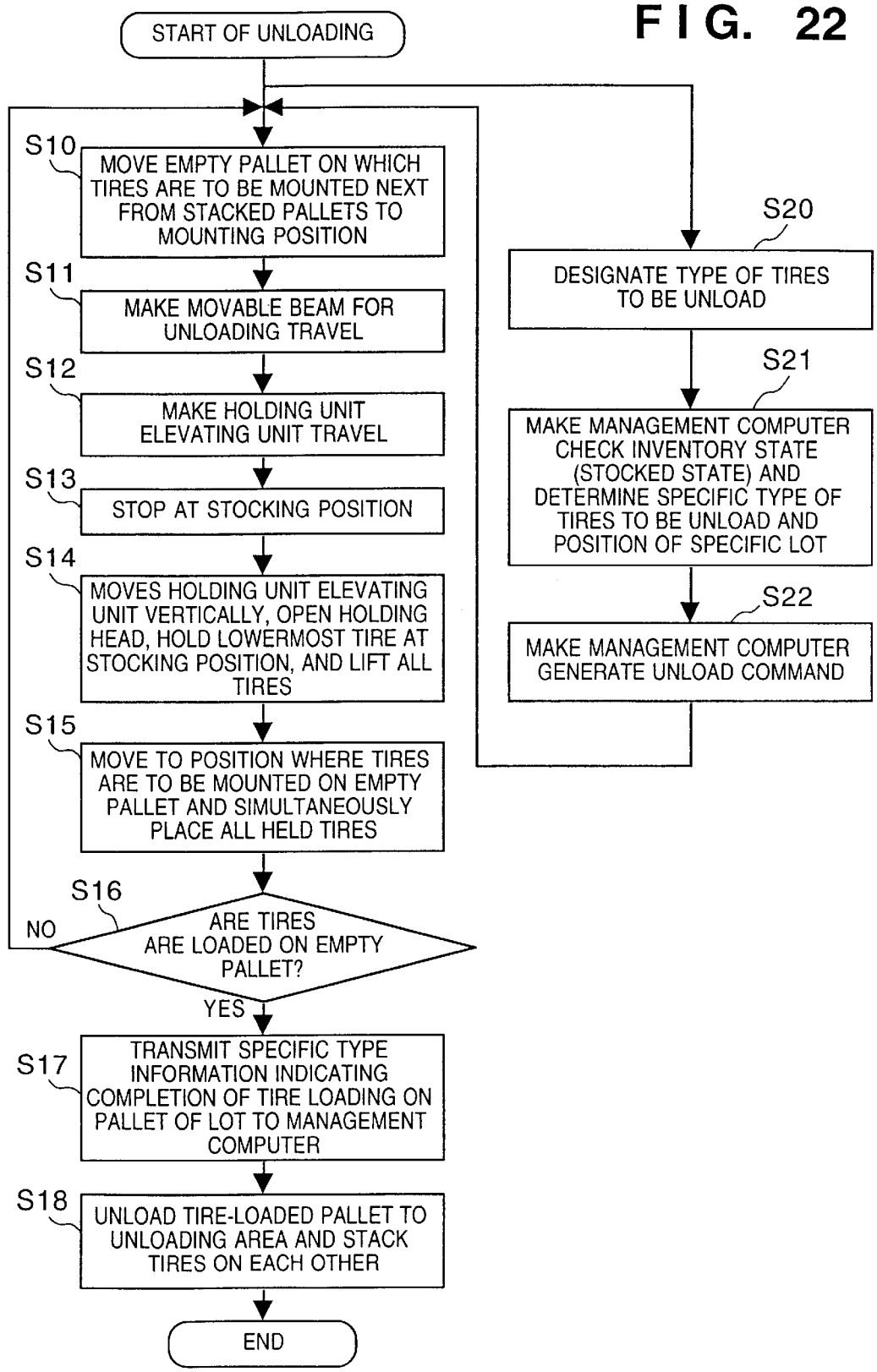
FIG. 22 is a flow chart for explaining how a tire-loaded pallet is prepared by loading tires on a loaded empty pallet 30 in a stacked state.

FIG. 22 is a flow chart for explaining operation up to the preparation of a tire-loaded pallet prepared by stacking tires on the empty pallet 30 loaded as shown in FIG. 15.

Referring to FIG. 22, when a program for unloading is started, the empty pallets 30 are loaded from the direction indicated by the double arrow in FIG. 15, and one of the empty pallets 30 is extracted by the empty pallet stacking unit 43 and conveyed toward the transfer conveyor 42 in step S10. Thereafter, in step S11, the movable beam 15 is made to travel. In step S12, the holding unit 18 is made to travel, and the holding head 19 is positioned and stopped above the proper tire position in the stocking area.

In step S14, the tire at the lowermost position is held as shown in FIGS. 18A and 18B, and the tires in a stacked state are moved upward. In step S15, the holding head 19 moves to a position above the empty pallet 30 standing by at the transfer position P2 in FIG. 14, and releases and places all the tires. The processing from step S10 to step S15 is repeatedly executed until it is determined in step S16 that loading of stock objects on the empty pallet is complete.

When the completion of loading is designated to the management computer 22 in step S17, the tire-loaded pallet 30 is stacked by the loaded pallet stacking unit 45 to complete a preparation for unloading in step S18.

When the program for unloading is started, the type of tire to be unloaded is designated in step S20, and the real stocking position of the tire which is stored in the above address space is obtained. In step S22, an unload command is output, together with position information.

The above operation performed by the management computer 22 can be summarized as follows. Inventory management data of the respective tires loaded in the stocking area is monitored. In response to an unload request, the management computer 22 determines a stacked state, and performs control to move the holding head to the real stocking space where the maximum number of tires can be unloaded by one holding operation. In addition, after predetermined tires are unloaded, a subtraction is performed, and a load request is stored. When predetermined tires are loaded from the loading conveyor, the holding head is moved to receive them to perform replenishment. Furthermore, the empty state and loaded state of the pallet 30 are monitored, and the stacked pallets are unloaded.

When a plurality of lines 40 are installed as shown in FIG. 16, a LAN is constructed among management computers to perform control to keep a proper inventory state on each line.

FIG. 23 is a perspective view showing another structure of the line 40 for the tire automated warehouse in FIG. 14. The same reference numerals in FIG. 23 denote the same parts as those described above, and a description thereof will be omitted. As shown in FIG. 23, a flat pallet 30 is prepared below the fixed beams 13 and conveyed in the direction indicated by the arrows by a conveyor 300. This flat pallet is stopped at the tire stacking position, and a held tire is placed on the pallet and conveyed to the next step in the direction indicated by the arrows. With this structure, operation on the assembly line can be smoothly performed.

As has been described above, according to the present invention, an automated warehouse with high space utilization efficiency and floor utilization efficiency can be provided. In addition, a management method for an automated warehouse with high loading/unloading efficiency can be provided.

In addition, there are provided an automated warehouse and automated warehouse management method, which can eliminate the need to add a branch conveyor and installation area when more different types of tires with more different sizes are to be handled, and greatly shorten the time required to stack tires on each other, standby time, and convey time so as to shorten the time to obtain a tire-loaded pallet.

As many apparently widely different embodiments of the present invention can be made without departing from the spirit and scope thereof, it is to be understood that the invention is not limited to the specific embodiments thereof except as defined in the appended claims.

What is claimed is:

1. An automated warehouse in which various types of tires with various sizes randomly loaded from a previous process are assorted first, and then stacked on each other on a pallet to be unloaded, characterized by comprising:

a loading area, stocking area, and unloading area which are arranged to be adjacent to each other;

loading/conveying means, placed in said loading area, for loading the various types of tires with the various sizes;

tire discrimination means, placed in said loading area, for identifying the various types and various sizes;

two-dimensional moving means for two-dimensionally moving holding unit elevating means at a predetermined height from each of said areas, said holding unit elevating means raising/lowering a holding unit which is driven between a holding state in which said holding unit holds the tire from an inner diameter side and a releasing state in which the tire is released;

a plurality of real stocking spaces which are set by dividing said stocking area into areas and assigning the areas according to the various types and various sizes and in which tires of the same type are stocked in a stacked state;

pallet loading/unloading means placed in said unloading area and constituted by a pallet loading unit for loading an empty pallet and a pallet unloading unit for unloading a tire-loaded pallet on which the tires in the stacked state are loaded;

transfer means which is placed between said pallet loading/unloading means and said stocking area and moved between said pallet loading unit, a transfer position, and said pallet unloading unit; and an address space stored in control means in correspondence with said real stocking spaces, wherein one tire or the tires in the stacked state are transferred onto an empty pallet positioned at the transfer position by cooperation between said holding unit elevating means and said two-dimensional moving means, and said real stocking spaces are managed by updating the address space in accordance with the identification result obtained by said tire discrimination means and an unloading result obtained by the cooperation of said holding unit elevating means and said two-dimensional moving means, and predetermined driving control is performed on said holding unit elevating means, said two-dimensional moving means, and said pallet loading/unloading means.

2. The warehouse according to claim 1, characterized in that said two-dimensional moving means comprises first two-dimensional moving means which moves between said loading/conveying means and said real stocking space and second two-dimensional moving means which moves between said real stocking space and said transfer means.

3. The warehouse according to claim 1, characterized in that said holding unit elevating means for raising/lowering said holding unit comprises a double-speed mechanism.

4. The warehouse according to claim 1, characterized in that said warehouse further comprises common convey means which is commonly installed for said loading/ conveying means to load the various types of tires with various sizes from previous process, and a plurality of automated warehouses are arranged to branch from said common convey means such that the number of automated warehouses can be increased/decreased.

5. The warehouse according to claim 1, characterized by further comprising display means for displaying a stored state in said real stocking space.

6. A management method for an automated warehouse in which various types of tires with various sizes randomly loaded from a previous process are assorted first, and then stacked on each other on a pallet to be unloaded, characterized by comprising the steps of:

arranging a loading area, stocking area, and unloading area to be adjacent to each other;

loading the various types of tires with the various sizes by using loading/conveying means placed in the loading area;

identifying the various types of tires with the various sizes by using tire discrimination means placed in the loading area;

two-dimensionally moving a two-dimensional moving means at a predetermined height from each of the areas, said two-dimensional moving means including holding unit elevating means for raising/lowering a holding unit driven between a holding state in which said holding unit holds the tire from an inner diameter side and a releasing state in which the tire is released;

dividing the stocking area into a plurality of real storing areas which are set by being assigned according to the various types and various sizes and in which one tire or tires in a stacked state are stored;

loading an empty pallet into a pallet loading unit by using pallet loading/unloading means placed in the unloading area, and unloading a tire-loaded pallet on which the tires in the stacked state are loaded from a pallet unloading unit;

moving the empty pallet and tire-loaded pallet between said pallet loading unit, a transfer position, and said pallet unloading unit by using transfer means placed between said pallet loading/unloading means and the stocking area; and setting an address space stored in control means in correspondence with the real stocking spaces, wherein the tires in the stacked state are transferred onto an empty pallet positioned at the transfer position by cooperation between said holding unit elevating means and said two-dimensional moving means, and said real stocking spaces are managed by the step of updating the address space in accordance with the identification result obtained by said tire discrimination means and an unloading result obtained by the cooperation of said holding unit elevating means and said two-dimensional moving means, and predetermined driving control is performed on said holding unit elevating means, said two-dimensional moving means, and said loading/unloading means.

* * * * *